(12) United States Patent
Lehmann et al.

(10) Patent No.: US 7,057,024 B2
(45) Date of Patent: Jun. 6, 2006

(54) BLACK-DYEING INKS AND THEIR USE

(75) Inventors: Urs Lehmann, Basel (CH); Athanassios Tzikas, Pratteln (CH); Marcel Frick, Reinach (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 836 days.

(21) Appl. No.: 10/060,833

(22) Filed: Jan. 30, 2002

(65) Prior Publication Data

US 2003/0024435 A1 Feb. 6, 2003

Related U.S. Application Data

(62) Division of application No. 09/495,803, filed on Feb. 1, 2000, now Pat. No. 6,500,247.

(30) Foreign Application Priority Data

Feb. 5, 1999 (EP) .................................. 99810098

(51) Int. Cl.
*C09B 62/04* (2006.01)
*C09B 62/095* (2006.01)
*D06P 1/382* (2006.01)

(52) U.S. Cl. ........................... 534/618; 534/624; 8/549

(58) Field of Classification Search ................ 534/618, 534/624; 8/549
See application file for complete search history.

(56) References Cited

U.S. PATENT DOCUMENTS

| | | | | |
|---|---|---|---|---|
| 3,646,002 A * | 2/1972 | Andrew et al. | ............... | 534/624 |
| 3,826,799 A * | 7/1974 | Waring | ........................ | 534/621 |
| 4,994,111 A | 2/1991 | Quayle et al. | ........... | 106/31.51 |
| 4,994,562 A | 2/1991 | Lehmann | ..................... | 534/618 |
| 4,999,027 A | 3/1991 | Lehmann et al. | .............. | 8/543 |
| 5,021,557 A | 6/1991 | Begrich | ....................... | 534/560 |
| 5,023,274 A | 6/1991 | Püntener et al. | ............ | 534/618 |
| 5,071,442 A | 12/1991 | Luttringer et al. | .............. | 8/549 |
| 5,076,811 A | 12/1991 | Lehmann et al. | .............. | 8/641 |
| 5,112,958 A | 5/1992 | Lehmann et al. | ........... | 534/618 |
| 5,149,789 A | 9/1992 | Jessen et al. | ................ | 534/618 |
| 5,232,462 A | 8/1993 | Tzikas | ........................ | 8/549 |
| 5,243,033 A | 9/1993 | Tzikas | ........................ | 534/634 |
| 5,371,200 A | 12/1994 | Tzikas et al. | ............... | 534/618 |
| 5,383,960 A | 1/1995 | Gregory et al. | ........... | 106/31.48 |
| 5,410,041 A | 4/1995 | Müller | ........................ | 540/126 |
| 5,456,728 A | 10/1995 | Schwarz | ......................... | 8/549 |
| 5,525,124 A | 6/1996 | Landré et al. | .................. | 8/532 |
| 5,552,532 A * | 9/1996 | Klier et al. | .................. | 534/612 |
| 5,632,783 A | 5/1997 | Krallmann et al. | ............. | 8/549 |
| 5,684,138 A | 11/1997 | Klier et al. | ................. | 534/612 |
| 5,704,951 A | 1/1998 | Negri et al. | ..................... | 8/546 |
| 5,717,078 A | 2/1998 | Tzikas et al. | ............... | 534/634 |
| 5,762,653 A | 6/1998 | Adam et al. | ..................... | 8/638 |
| 5,779,739 A | 7/1998 | Von Der Eltz et al. | ......... | 8/549 |
| 5,837,827 A * | 11/1998 | Reichert et al. | ............. | 534/618 |
| 5,936,073 A * | 8/1999 | Phillips et al. | ............... | 534/618 |
| 5,958,086 A | 9/1999 | Adam et al. | ..................... | 8/641 |
| 5,972,084 A | 10/1999 | Lacroix et al. | ........... | 106/31.48 |
| 6,015,454 A | 1/2000 | Lacroix et al. | ........... | 106/31.47 |
| 6,307,034 B1 * | 10/2001 | Reichert | ..................... | 534/618 |

FOREIGN PATENT DOCUMENTS

| | | |
|---|---|---|
| CH | 621358 * | 1/1981 |
| EP | 0597672 | 5/1994 |
| EP | 0 625 551 | 11/1994 |
| EP | 0 832 939 | 4/1998 |
| EP | 0866105 | 9/1998 |
| GB | 1 389 053 | 4/1975 |
| GB | 1 529 645 | 10/1978 |
| GB | 2 148 921 | 6/1985 |

OTHER PUBLICATIONS

Derwent Abstracts 98-181201/17 (EP 0 832 939—Apr. 1, 1998).
Derwent Abstracts 93-137120/17 (JP05 070 707—Mar. 23, 1993).
Chemical Abstracts 120:32800y (1994) for JP 05 070 707.

* cited by examiner

*Primary Examiner*—Fiona T. Powers
(74) *Attorney, Agent, or Firm*—Joseph C. Suhadolnik

(57) ABSTRACT

Black-dyeing aqueous inks comprising
20 to 95% by weight of at least one dye (A), together with
5 to 80% by weight of at least one dye chosen from the group consisting of (B) and (C), based on the total weight of the dyes (A), (B) and (C) in the ink, and
1 to 40% by weight of a water-miscible organic solvent, based on the total weight of the ink, the dye (A) containing, as the colouring part of the molecule, one or more radicals of the formula (I), (II), (III) or (IV)

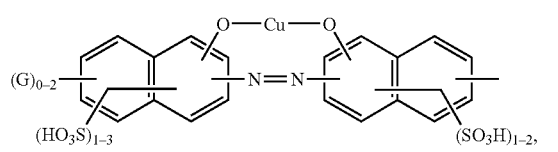

(I)

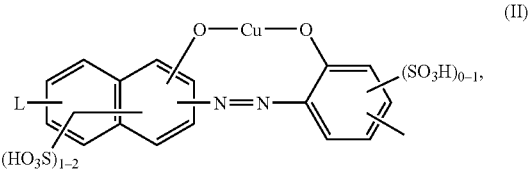

(II)

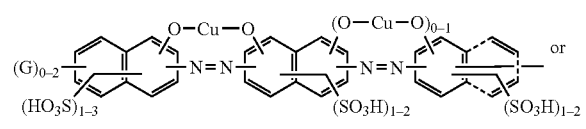

(III)

-continued

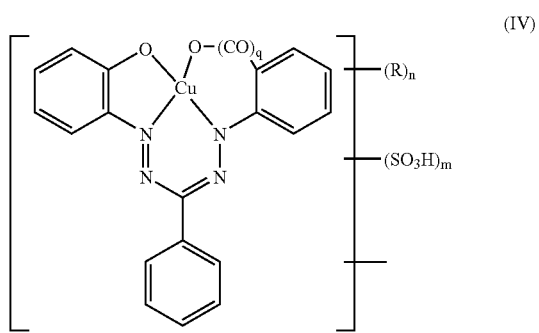

the dye (B) containing, as the coloring part of the molecule, one or more mono- or disazo radicals containing sulfo groups or one or more radicals of the formula (V), (VI), (VII) or (VIII)

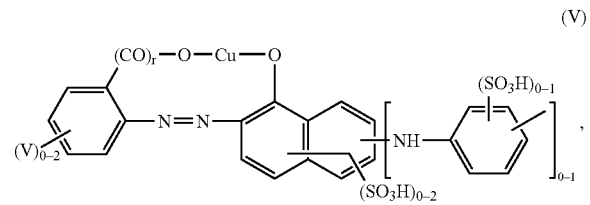

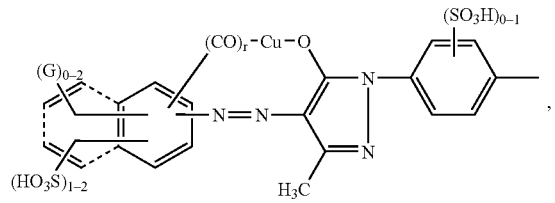

-continued

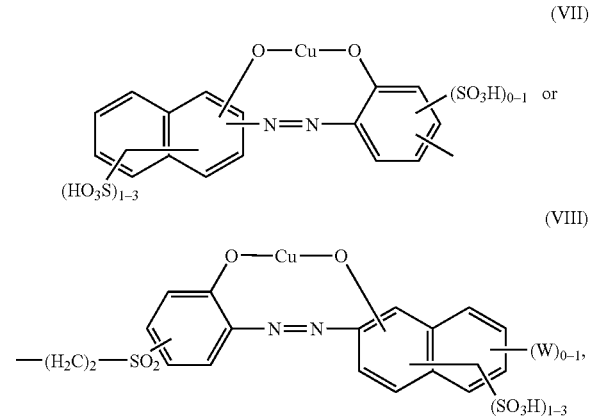

and the dye (C) containing, as the coloring part of the molecule, one or more mono- or disazo radicals containing sulfo groups or one or more radicals of the abovementioned formula (V), (VI), (VII) or (VIII) and one or more radicals of the abovementioned formula (I), (II), (III) or (IV), in which $(G)_{0-2}$ is 0 to 2 identical or different substituents from the group consisting of substituted or unsubstituted amino, hydroxyl and nitro, L is substituted or unsubstituted amino, R is halogen, $C_1$–$C_4$alkyl, $C_1$–$C_4$alkoxy, $C_2$–$C_4$alkanoylamino, hydroxyl, carboxyl, nitro or cyano, $(V)_{0-2}$ is 0 to 2 identical or different substituents from the group consisting of halogen, $C_1$–$C_4$alkyl, $C_1$–$C_4$alkoxy, β-sulfatoethylsulfonyl and sulfo, $(W)_{0-1}$ is an N-acyl radical, if any, n is the number 0, 1, 2 or 3, m is the number 1, 2 or 3 and r and q are the number 0 or 1.

The inks according to the invention are distinguished by good black shades without a change in shade in artificial light (metamerism) and an outstanding fastness to light.

2 Claims, No Drawings

BLACK-DYEING INKS AND THEIR USE

This is a divisional of application Ser. No. 09/495,803, filed on Feb. 1, 2000, now U.S. Pat. No. 6,500,247.

The present invention relates to black-dyeing inks based on navy blue copper complex azo or copper complex formazan dyes, black-dyeing mixtures based on such dyes and novel dyes.

The inks on which the present invention is based are particularly suitable for printing paper, preferably by the ink-jet printing process, and for dyeing or printing fibre materials which contain nitrogen or hydroxyl groups, and give dyeings or prints which are distinguished by a high fastness to light.

The present invention therefore relates to black-dyeing aqueous inks comprising
20 to 95% by weight of at least one dye (A), together with 5 to 80% by weight of at least one dye chosen from the group consisting of (B) and (C), based on the total weight of the dyes (A), (B) and (C) in the ink, and
1 to 40% by weight of a water-miscible organic solvent, based on the total weight of the ink, the dye (A) containing, as the colouring part of the molecule, one or more radicals of the formula (I), (II), (III) or (IV)

the dye (B) containing, as the colouring part of the molecule, one or more mono- or disazo radicals containing sulfo groups or one or more radicals of the formula (V), (VI), (VII) or (VIII)

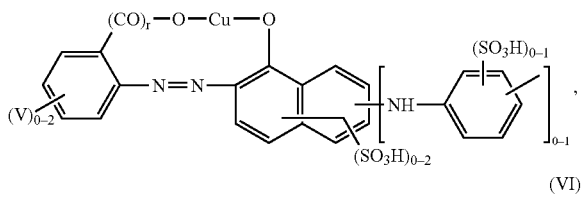

(V)

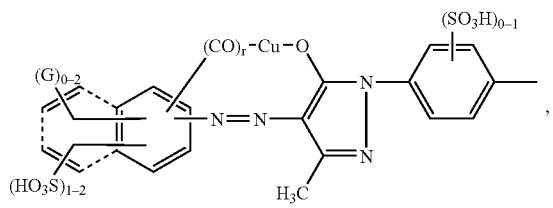

(VI)

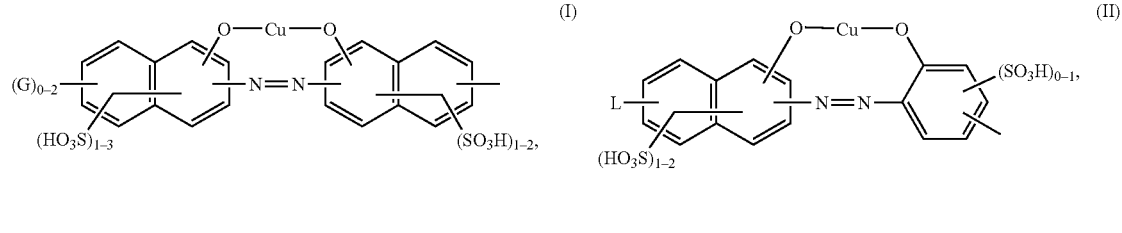

(I)

(II)

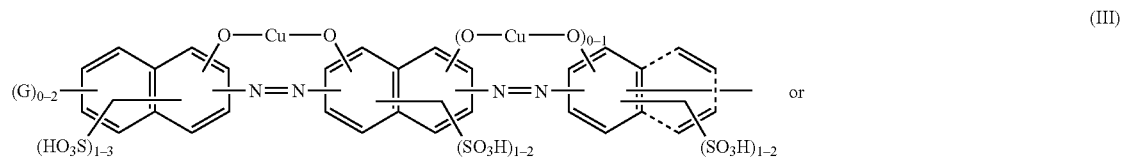

(III)

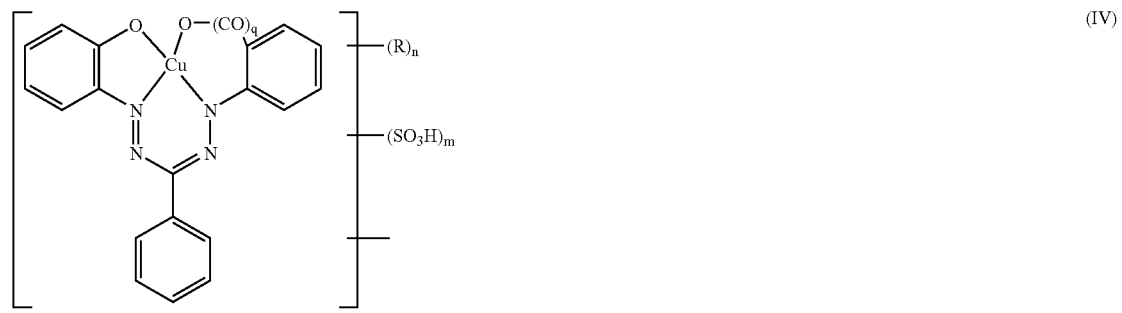

(IV)

-continued

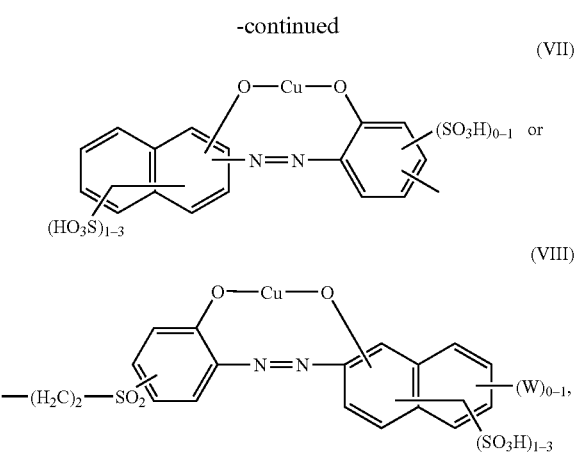

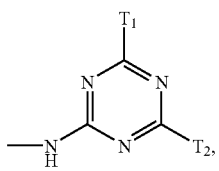

in which $T_1$ and $T_2$ independently of one another are fluorine or chlorine, $C_1$–$C_4$alkylthio which is unsubstituted or substituted in the alkyl moiety by hydroxyl, sulfato, sulfo or carboxyl, hydroxyl, amino, N-mono- or N,N-di-$C_1$–$C_4$alkylamino which is unsubstituted or substituted in the alkyl moiety by hydroxyl, carboxyl, $C_1$–$C_4$alkoxy, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato, or naphthylamino which is unsubstituted or substituted by 1 to 3 sulfo groups.

and the dye (C) containing, as the colouring part of the molecule, one or more mono- or disazo radicals containing sulfo groups or one or more radicals of the abovementioned formula (V), (VI), (VII) or (VIII) and one or more radicals of the abovementioned formula (I), (II), (III) or (IV), in which $(G)_{0-2}$ is 0 to 2 identical or different substituents from the group consisting of substituted or unsubstituted amino, hydroxyl and nitro, L is substituted or unsubstituted amino, R is halogen, $C_1$–$C_4$alkyl, $C_1$–$C_4$alkoxy, $C_2$–$C_4$alkanoylamino, hydroxyl, carboxyl, nitro or cyano, $(V)_{0-2}$ is 0 to 2 identical or different substituents from the group consisting of halogen, $C_1$–$C_4$alkyl, $C_1$–$C_4$alkoxy, β-sulfatoethylsulfonyl and sulfo, $(W)_{0-1}$ is an N-acyl radical, if any, n is the number 0, 1, 2 or 3, m is the number 1, 2 or 3 and r and q are the number 0 or 1.

$C_1$–$C_4$alkyl R and V is, for example, methyl, ethyl, propyl, isopropyl, butyl, sec-butyl, tert-butyl or isobutyl, preferably methyl or ethyl, and in particular methyl.

$C_1$–$C_4$alkoxy R and V is, for example, methoxy, ethoxy, propoxy, isopropoxy, butoxy or isobutoxy, preferably methoxy or ethoxy, and in particular methoxy.

Halogen R and V is, for example, fluorine, chlorine or bromine, preferably chlorine or bromine, and in particular chlorine.

$C_2$–$C_4$alkanoylamino R is, for example, acetylamino or propionylamino, in particular acetylamino.

R is preferably $C_1$–$C_4$alkyl, $C_1$–$C_4$alkoxy, hydroxyl, carboxyl, nitro or cyano, in particular $C_1$–$C_4$alkyl, $C_1$–$C_4$alkoxy, hydroxyl or carboxyl, and especially carboxyl.

V is preferably halogen, β-sulfatoethylsulfonyl or sulfo, in particular sulfo.

Substituted or unsubstituted amino G and L is, for example, amino, N-mono- or N,N-di-$C_1$–$C_4$alkylamino which are unsubstituted or substituted in the alkyl moiety by $C_1$–$C_4$alkoxy, hydroxyl, sulfato or sulfo, or phenylamino or N—$C_1$–$C_4$alkyl-N-phenylamino which are unsubstituted or substituted in the phenyl ring by $C_1$–$C_4$alkyl, $C_1$–$C_4$alkoxy, $C_2$–$C_4$alkanoylamino, sulfo, carboxyl or halogen, in particular amino or phenylamino.

An N-acyl radical W is, for example, $C_2$–$C_4$alkanoylamino, for example acetylamino or propionylamino, benzoylamino which is unsubstituted or substituted in the phenyl ring by $C_1$–$C_4$alkyl, $C_1$–$C_4$alkoxy, halogen or sulfo, or a radical of the formula, q is preferably the number 1.

m is preferably the number 2 or 3, in particular 2.

If R is carboxyl, the sum of m+n is preferably 3 or 4, and in particular 3.

Inks according to the invention which are preferred are those which contain a radical of the formula (IV) in which q is the number 1, n is the number 0 and m is the number 2 or 3.

The sulfo groups of the dyes (A), (B) and (C) in the inks according to the invention are either in the form of the free sulfonic acid or, preferably, in the salt form thereof, for example as the sodium, lithium, potassium or ammonium salt or as the salt of an organic amine, for example as the triethanolammonium salt.

The dyes (A), (B) and (C) in the inks according to the invention contain no further colouring molecular moieties in addition to the colouring molecular moieties mentioned.

The dye (A) in the inks according to the invention preferably contains, as the colouring molecular moiety (chromophore), one or two radicals of the formula (I), (II), (III) or (IV).

If the dye (A) contains a radical of the formula (I), (II), (III) or (IV), a non-chromophoric radical is bonded to this radical via the free valency drawn in the formulae (I), (II), (III) and (IV).

Examples of a non-chromophoric radical are the following:

$C_2$–$C_6$alkanoylamino which is unsubstituted or substituted in the alkyl moiety by hydroxyl, sulfo, carboxyl or $C_1$–$C_4$alkoxy, which can in its turn be substituted in the alkyl moiety by carboxyl, for example acetylamino, hydroxyacetylamino, methoxyacetylamino, carboxymethylenoxyacetylamino, propionylamino or β-carboxypropionylamino; N—$C_1$–$C_4$alkylamino which is unsubstituted or substituted in the alkyl moiety by hydroxyl, sulfo, carboxyl or $C_1$–$C_4$alkoxy, for example 3-sulfopropylamino or 4-sulfobutylamino; benzoylamino which is unsubstituted or substituted in the phenyl moiety by hydroxyl, sulfo, halogen, $C_1$–$C_4$alkyl or $C_1$–$C_4$alkoxy; $C_2$–$C_6$alkoxycarbonylamino which is unsubstituted or substituted in the alkyl moiety by hydroxyl, $C_1$–$C_4$alkyl or $C_1$–$C_4$alkoxy; phenoxycarbonylamino which is unsubstituted or substituted in the phenyl moiety by hydroxyl, $C_1$–$C_4$alkyl or $C_1$–$C_4$alkoxy; phenylsulfonylamino which is unsubstituted or substituted in the phenyl moiety by $C_1$–$C_4$alkyl or $C_2$–$C_4$alkanoylamino, or $C_1$–$C_4$alkylsulfonylamino, for example methyl- or ethylsulfonylamino, or a radical of the formula,

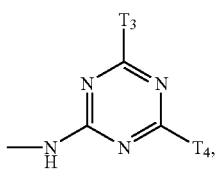

in which $T_3$ and $T_4$ independently of one another are a substituent which is not fibre-reacted, for example $C_1$–$C_4$alkoxy, $C_1$–$C_4$alkylthio which is unsubstituted or substituted in the alkyl moiety by hydroxyl, sulfato, sulfo or carboxyl, hydroxyl, amino, N-mono- or N,N-di-$C_1$–$C_4$alkylamino which is unsubstituted or substituted in the alkyl moiety by hydroxyl, carboxyl, $C_1$–$C_4$alkoxy, sulfato or sulfo, morpholino, phenylamino or N—$C_1$–$C_4$alkyl-N-phenylamino, which are unsubstituted or substituted in the phenyl ring by sulfo, carboxyl, acetylamino, chlorine, methyl or methoxy, and in which the alkyl is unsubstituted or substituted by hydroxyl, sulfo or sulfato, or naphthylamino which is unsubstituted or substituted by 1 to 3 sulfo groups.

Non-chromophoric radicals which are bonded via the free valency in the formula (I), (II), (III) or (IV) are also fibre-reactive radicals.

Fibre-reactive radicals are, for example, an alkanoyl or alkylsulfonyl radical substituted by an atom which can be split off or a group which can be split off, an alkenoyl or alkenesulfonyl radical which is unsubstituted or substituted by an atom which can be split off or a group which can be split off, or an alkenoyl or alkenesulfonyl radical which contains a vinyl group. The alkanoyl, alkylsulfonyl and alkenesulfonyl radicals mentioned as a rule contain 2 to 8 carbon atoms and the alkenoyl radicals as a rule contain 3 to 8 carbon atoms. These radicals are also radicals which contain carbo- or heterocyclic 4-, 5- or 6-membered rings and are substituted by an atom which can be split off or a group which can be split off. Heterocyclic radicals are, for example, those which contain at least one substituent which can be split off bonded to a heterocyclic radical; inter alia, those which contain at least one reactive substituent bonded to a 5- or 6-membered heterocyclic ring, such as to a monoazine, diazine, triazine, pyridine, pyrimidine, pyridazine, pyrazine, thiazine, oxazine or asymmetric or symmetric triazine ring, or to such a ring system which has one or more fused-on aromatic rings, such as a quinoline, phthalazine, quinazoline, quinoxaline, acridine, phenazine and phenanthridine ring system.

Atoms which can be split off and groups which can be split off are, in addition to others, for example, halogen, such as fluorine, chlorine or bromine, ammonium, including hydrozinium, sulfato, thiosulfato, phosphato, acetoxy, propionoxy, azido, carboxypyridinium or thiocyanato.

The fibre-reactive radical and the chromophore of the formula (I), (II), (III) or (IV) can be bonded to one another by a bridge member. Bridge members are, in addition to the direct bond or, for example, an amino group, the most diverse radicals. The bridge member is, for example, an aliphatic, aromatic or heterocyclic radical; the bridge member can furthermore also be composed of different such radicals. The bridge member as a rule contains at least one functional group, for example the carbonyl, sulfonyl, carbonylamino, sulfonylamino or the amino group, it being possible for the amino group to be further substituted by $C_1$–$C_4$alkyl which is unsubstituted or substituted by halogen, hydroxyl, cyano, $C_1$–$C_4$alkoxy, $C_1$–$C_4$alkoxycarbonyl, carboxyl, sulfamoyl, sulfo or sulfato. An aliphatic radical is, for example, an alkylene radical having 1 to 7 carbon atoms or branched isomers thereof. The carbon chain of the alkylene radical can be interrupted by a heteroatom, for example an oxygen atom. An aromatic radical is, for example, a phenylene radical, which can be substituted by $C_1$–$C_4$alkyl, for example methyl or ethyl, $C_1$–$C_4$alkoxy, for example methoxy or ethoxy, halogen, for example fluorine, bromine or, in particular, chlorine, carboxyl or sulfo, and a heterocyclic radical is, for example, a piperazine or a triazine radical, it being possible for the triazine radical to contain a substituent which can be split off, for example fluorine or chlorine.

Such fibre-reactive radicals are known per se and a large number are described, for example, in Venkataraman "The Chemistry of Synthetic Dyes" Volume 6, Pages 1–209, Academic Press, New York, London 1972 or in U.S. Pat. No. 5,684,138.

The dyes (A) which comprise a chromophore of the formula (I), (II), (III) or (IV) are known or can be prepared analogously to known dyes.

Suitable dyes (A) which comprise a chromophore of the formula (IV) are, for example, C.I. Reactive Blue 52, 70, 83, 84, 104, 157, 160, 182, 202, 209, 212, 218, 220, 221, 226, 228 and 232 and the dyes of the formulae (IV.1), (IV.2), (IV.3), (IV.4), (IV.5), (IV.6), (IV.7) and (IV.8)

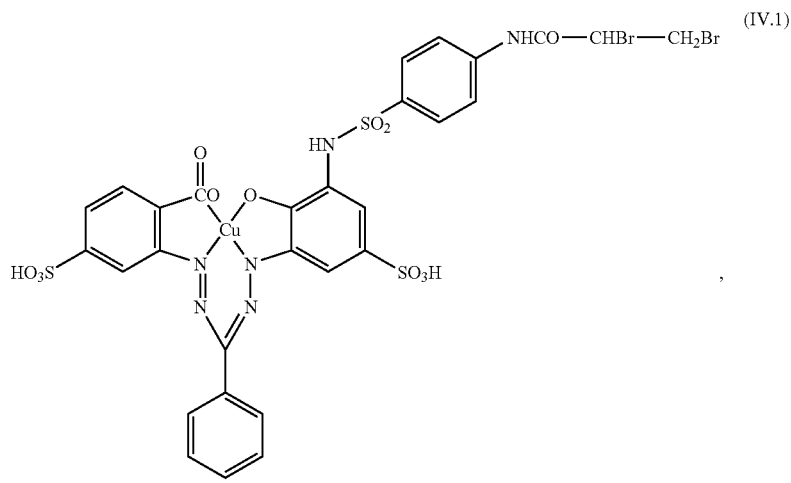

-continued
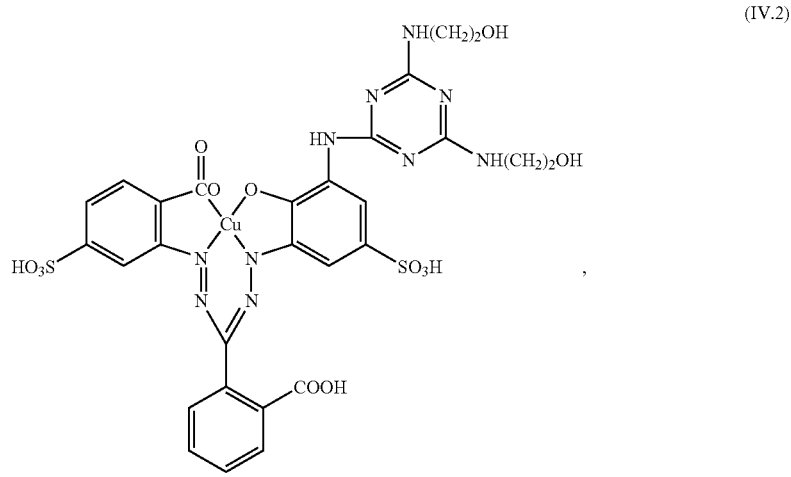
(IV.2)
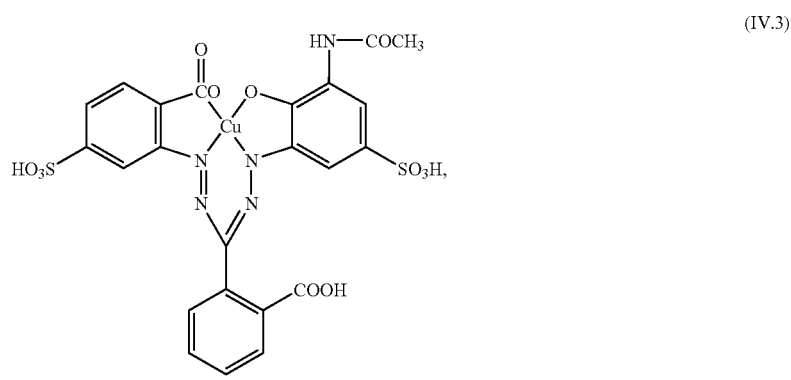
(IV.3)
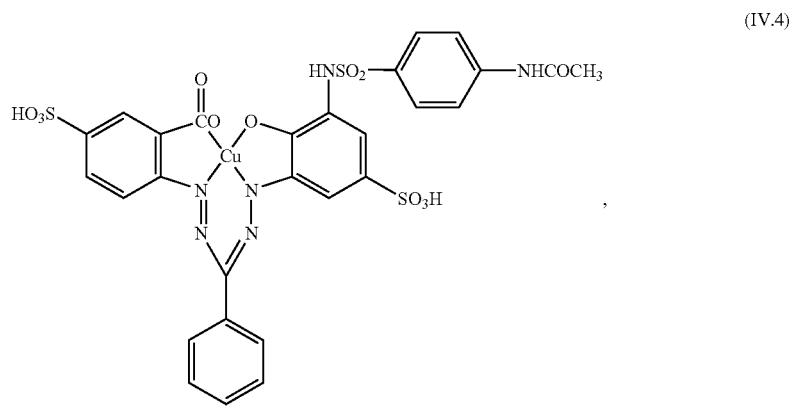
(IV.4)

(IV.5)
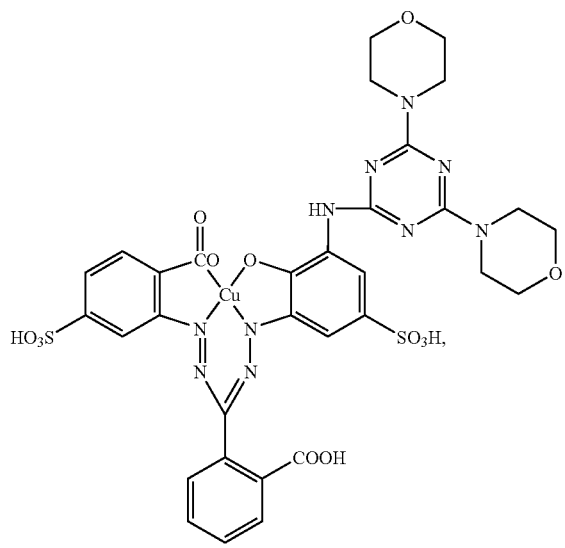
(IV.6)
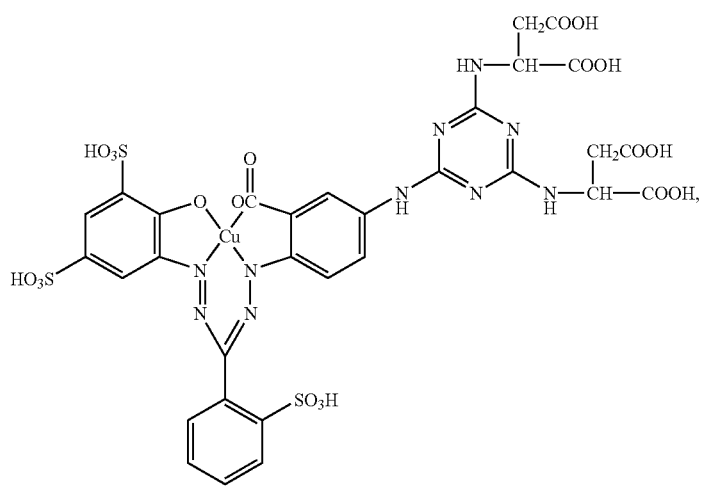
(IV.7)
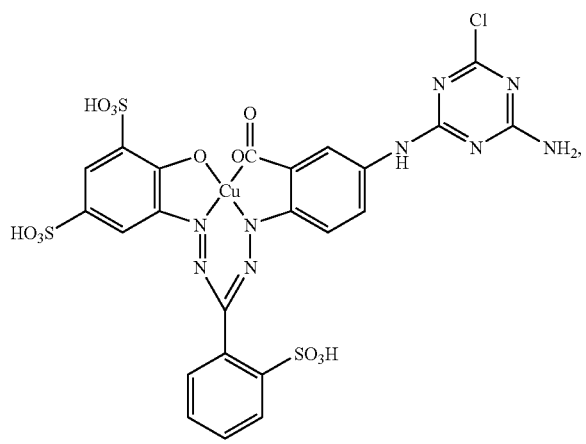

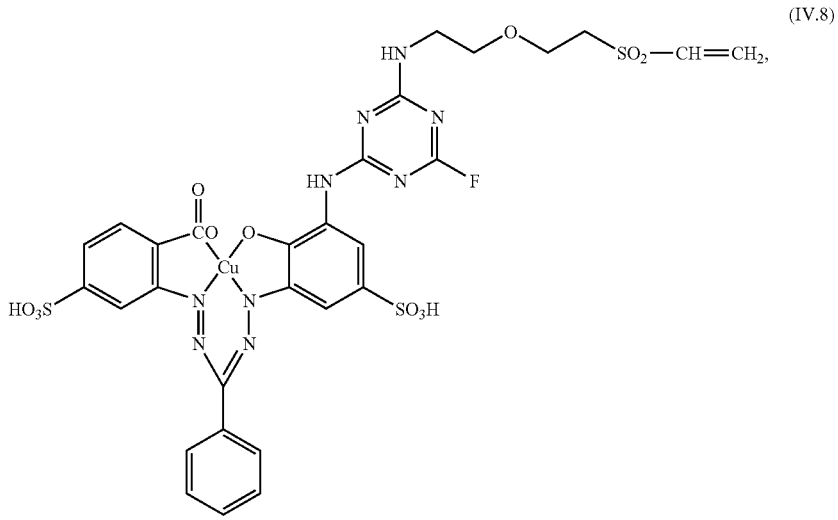

preferably C.I. Reactive Blue 52 and 182 and the dyes of the formulae (IV.1), (IV.2), (IV.3), (IV.4), (IV.5), (IV.6), (IV.7) and (IV.8), and in particular the dyes of the formulae (IV.1), (IV.2), (IV.3), (IV.4), (IV.5), (IV.6), (IV.7) and (IV.8).

Suitable dyes which comprise a chromophore of the formula (IV) and contain a fibre-reactive radical are furthermore described, for example, in GB-A-2 148 921, U.S. Pat. No. 4,994,562, U.S. Pat. No. 5,021,557, U.S. Pat. No. 5,023,274, U.S. Pat. No. 5,076,811, U.S. Pat. No. 5,112,958 and U.S. Pat. No. 5,371,200.

If the dye (A) contains two radicals of the formula (I), (II), (III) or (IV), these radicals are bonded to one another by a bridge member, in each case via the free valency in the formulae (I), (II), (III) and (IV). Bridge members are the most diverse radicals. The bridge member is, for example, an aliphatic, aromatic or heterocyclic radical; the bridge member can furthermore also be composed of different such radicals. The bridge member as a rule contains at least two functional groups, for example the carbonyl, sulfonyl, carbonylamino, sulfonylamino or the amino group, it being possible for the amino group to be further substituted by $C_1$–$C_4$alkyl which is unsubstituted or substituted by halogen, hydroxyl, cyano, $C_1$–$C_4$alkoxy, $C_1$–$C_4$alkoxycarbonyl, carboxyl, sulfamoyl, sulfo or sulfato. An aliphatic radical is, for example, an alkylene radical having 1 to 10 carbon atoms or branched isomers thereof. The carbon chain of the alkylene radical can be interrupted by a heteroatom, for example an oxygen atom. The term aliphatic radical also includes cycloaliphatic radicals. An aromatic radical is, for example, a naphthylene radical, the radical of a diphenyl or stilbene, or, in particular, a phenylene radical, which can be substituted by $C_1$–$C_4$alkyl, for example methyl or ethyl, $C_1$–$C_4$alkoxy, for example methoxy or ethoxy, halogen, for example fluorine, bromine or, in particular, chlorine, carboxyl or sulfo, and a heterocyclic radical is, for example, a triazine radical.

The dyes (A) which comprise two chromophore radicals of the formula (I), (II), (III) or (IV) bonded to one another via a bridge member are known or can be prepared analogously to known dyes. A suitable dye is, for example, the dye of the formula (IV.9)

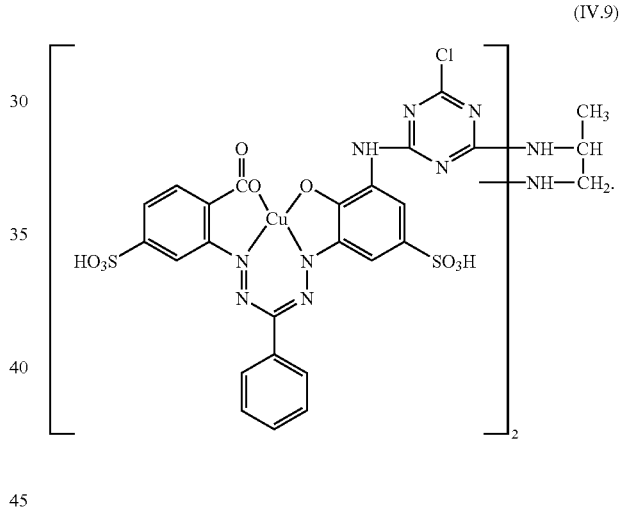

Suitable dyes (A) which comprise two chromophore radicals of the formula (IV) bonded to one another via a bridge member are furthermore described, for example, in GB-A-1 389 053, GB-A-2 148 921, U.S. Pat. No. 5,232,462, U.S. Pat. No. 5,410,041 and U.S. Pat. No. 5,684,138.

The chromophore of the formula (I), (II) or (III) contained in the dye (A) is preferably one or two radicals of the formula (I.1), (I.2), (I.3), (I.4), (I.5), (II.1), (II.2), (II.3) or (III.1)

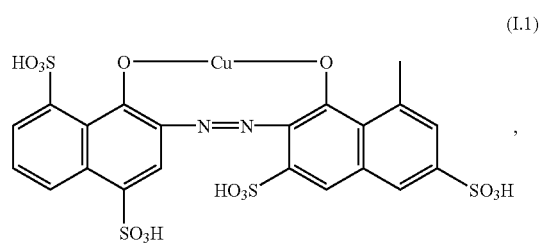

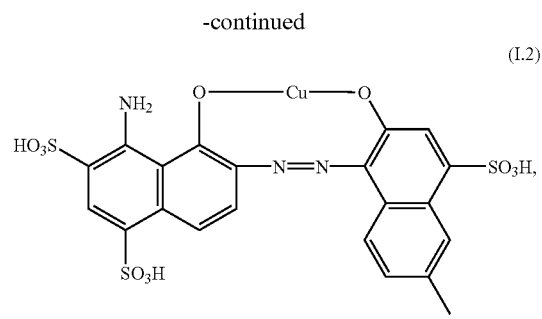
(I.2)
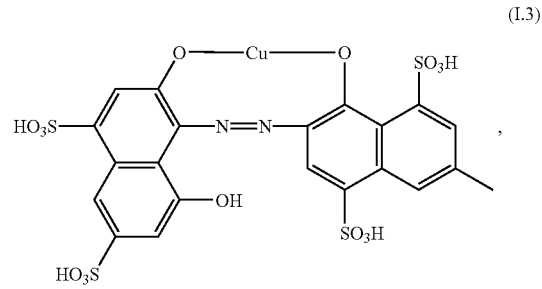
(I.3)
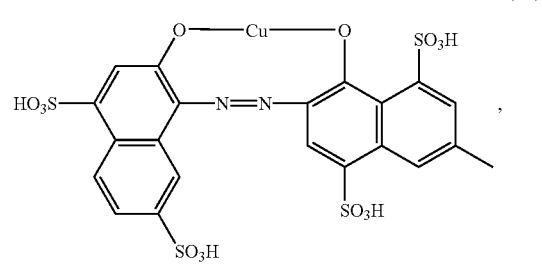
(I.4)
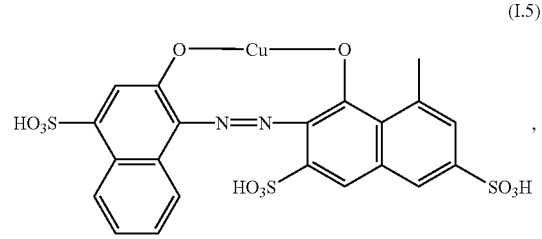
(I.5)
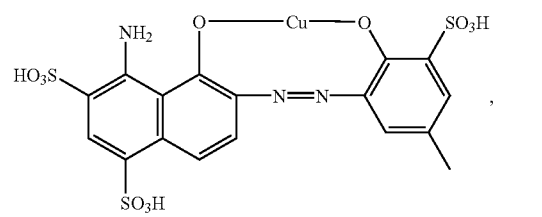
(II.1)
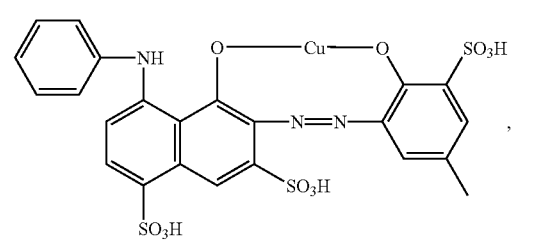
(II.2)
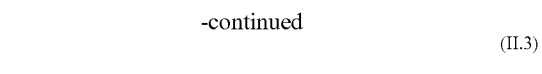
(II.3)
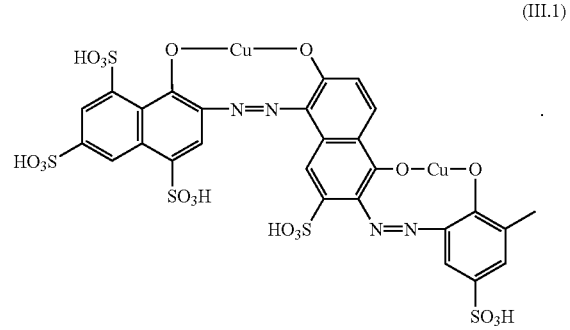
(III.1)
The chromophore of the formula (IV) contained in the dye (A) is preferably one or two radicals of the formula (IVa), (IVb) or (IVc)
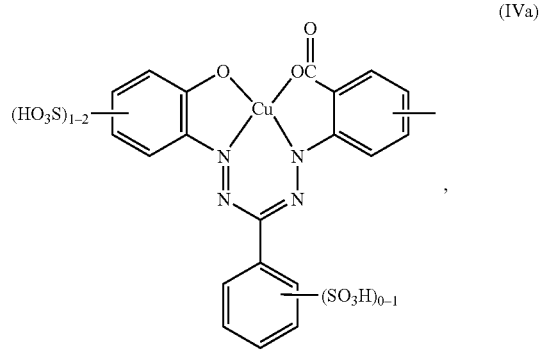
(IVa)
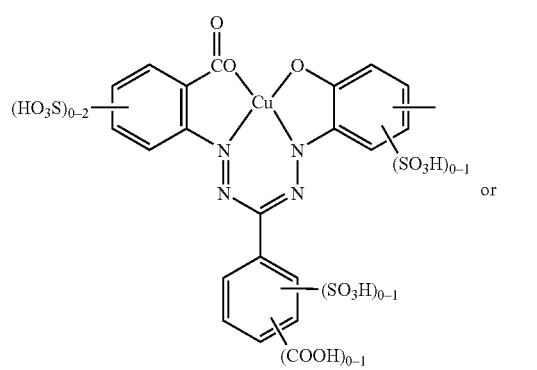
(IVb)

-continued (IVc)

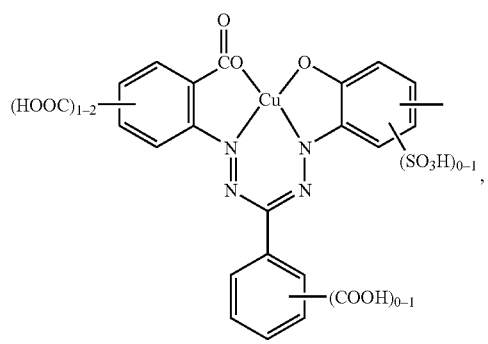

in particular of the formula (IVb) or (IVc).

The chromophore contained in the dye (B) is preferably one or two mono- or disazo radicals containing sulfo groups or one or two radicals of the formula (V), (VI), (VII) or (VIII).

The chromophore contained in the dye (C) is preferably a mono- or disazo radical containing sulfo groups or a radical of the formula (V), (VI), (VII) or (VIII) and a radical of the formula (I), (II), (III) or (IV).

The mono- or disazo radicals and the radicals of the formulae (V), (VI), (VII) and (VIII) on which the dyes (B) and (C) of the inks according to the invention are based are, for example, yellow-, orange-, red- or claret-to violet-colouring dye radicals.

Suitable dye radicals of the formula (V), (VI), (VII) and (VIII) are, for example, those of the formulae (V.1), (V.2), (V.3), (V.4), (V.5), (V.6), (V.7), (VI.1), (VII.1), (VIII.1), (VIII.2) and (VIII.3)

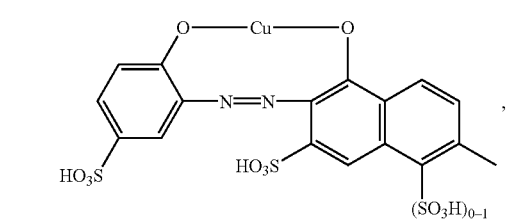

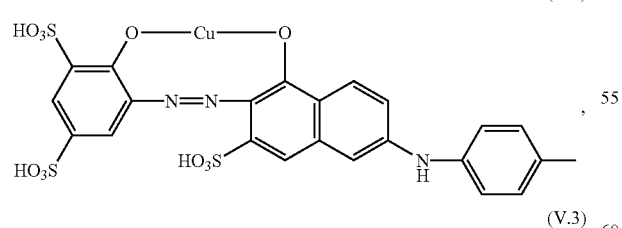

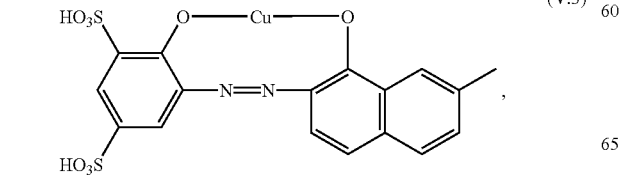

-continued

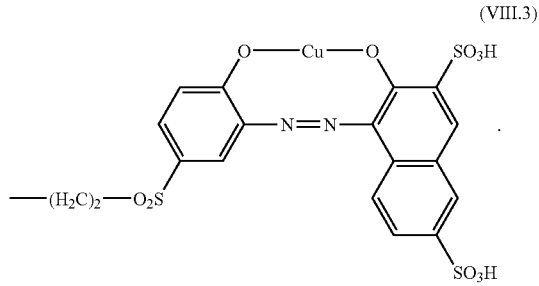

(VIII.3)

Examples of substituents in the mono- or disazo radical are the following: alkyl groups having 1 to 4 carbon atoms, such as methyl, ethyl, propyl, isopropyl or butyl, it being possible for the alkyl radicals to be further substituted, for example by hydroxyl, sulfo or sulfato; alkoxy groups having 1 to 4 carbon atoms, such as methoxy, ethoxy, propoxy, isopropoxy or butoxy, it being possible for the alkyl radicals to be further substituted, for example by hydroxyl, sulfo or sulfato; phenyl which is unsubstituted or substituted by $C_1$–$C_4$alkyl, $C_1$–$C_4$alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$–$C_4$alkyl, $C_1$–$C_4$alkoxy, halogen or sulfo; phenylamino which is unsubstituted or substituted in the phenyl ring by $C_1$–$C_4$alkyl, $C_1$–$C_4$alkoxy, halogen or sulfo; N,N-di-β-hydroxyethylamino; N,N-di-β-sulfatoethylamino; sulfobenzylamino; N,N-disulfobenzylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; N-alkylcarbamoyl having 1 to 4 carbon atoms in the alkyl radical, such as N-methylcarbamoyl or N-ethylcarbamoyl; sulfamoyl; N-mono- or N,N-dialkylsulfamoyl having in each case 1 to 4 carbon atoms, such as N-methylsulfamoyl, N-ethylsulfamoyl, N-propylsulfamoyl, N-isopropylsulfamoyl or N-butylsulfamoyl, it being possible for the alkyl radicals to be further substituted, for example by hydroxyl or sulfo; N-(β-hydroxyethyl)-sulfamoyl; N,N-di-(β-hydroxyethyl)-sulfamoyl; N-phenylsulfamoyl which is unsubstituted or substituted by $C_1$–$C_4$alkyl, $C_1$–$C_4$alkoxy, halogen, carboxyl or sulfo; ureido; hydroxyl; carboxyl; sulfomethyl or sulfo, and the fibre-reactive radicals described above.

The mono- or disazo radicals containing sulfo groups in the dyes (B) and (C) of the inks according to the invention are preferably those of the formula (2) or (3)

D-N=N-(M-N=N)$_u$-K-      (2)

or

-D-N=N-(M-N=N)$_u$-K      (3), in which D is the radical of a diazo component of the benzene or naphthalene series, M is the radical of a middle component of the benzene or naphthalene series, K is the radical of a coupling component of the benzene, naphthalene, pyrazolone, 6-hydroxypyrid-2-one or acetoacetic acid arylamide series and u is the number 0 or 1, where D, M and K can carry subsfituents customary in azo dyes, for example $C_1$–$C_4$alkyl or $C_1$–$C_4$alkoxy which are unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, sulfomethyl, $C_2$–$C_4$alkanoylamino, benzoylamino which is unsubstituted or substituted in the phenyl ring by $C_1$–$C_4$alkyl, $C_1$–$C_4$alkoxy, halogen or sulfo, phenyl which is unsubstituted or substituted by $C_1$–$C_4$alkyl, $C_1$–$C_4$alkoxy, halogen, carboxyl or sulfo, and fibre-reactive radicals.

If u is the number 1, D, M and K are preferably radicals of a diazo, middle and coupling component of the benzene or naphthalene series, and in particular of the benzene series.

A radical of the formula (2) or (3) in the dye (B) has bonded to it, via the free valency drawn in the formula (2) or (3), a non-chromophoric substituent, for example one of the substituents mentioned above for mono- or disazo radicals, or a radical of the formula,

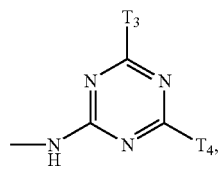

in which $T_3$ and $T_4$ independently of one another are a substituent which is not fibre-reactive, for example $C_1$–$C_4$alkoxy, $C_1$–$C_4$alkylthio which is unsubstituted or substituted in the alkyl moiety by hydroxyl, sulfato, sulfo or carboxyl, hydroxyl, amino, N-mono- or N,N-di-$C_1$–$C_4$alkylamino which are unsubstituted or substituted in the alkyl moiety by hydroxyl, carboxyl, $C_1$–$C_4$alkoxy, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy, and in which the alkyl is unsubstituted or substituted by hydroxyl, sulfo or sulfato, or naphthylamino which is unsubstituted or substituted by 1 to 3 sulfo groups.

The radicals mentioned can also satisfy the free valency of the dye (B) which comprises a chromophore radical of the formula (V), (VI), (VII) or (VIII).

The dyes (B) which comprise a chromophore of the formula (2), (3), (V), (VI), (VII) or (VIII) are known or can be prepared analogously to known dyes.

Suitable dyes (B) which comprise a chromophore of the formula (2) are, for example, the dyes of the formulae (2.1), (2.2), (2.3) and (2.4)

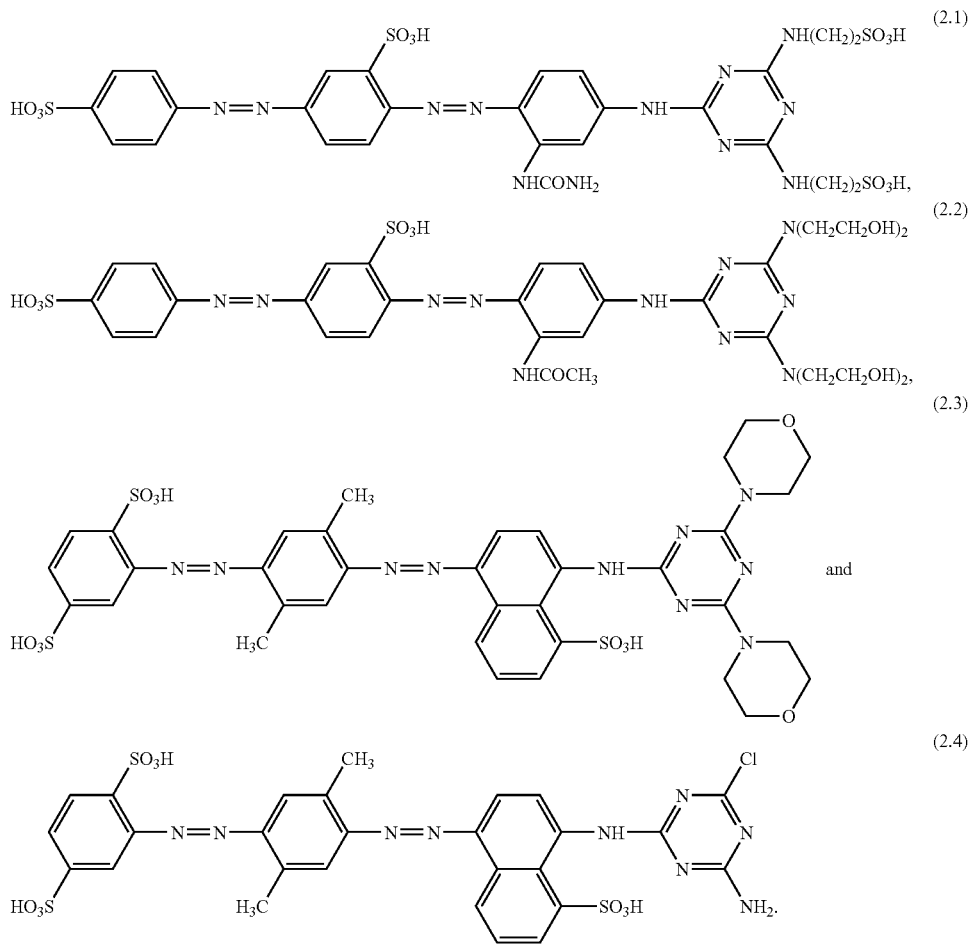

Two radicals of the formula (2), (3), (V), (VI), (VIII) or (VIII), contained in the dye (B) are bonded to one another by a bridge member, in each case via the free valency. Bridge members are, for example, those radicals which have already been described above in connection with the dye (A) containing two radicals of the formula (I), (II), (III) or (IV).

The dyes (B) which comprise two chromophore radicals of the formula (2), (3), (V), (VI), (VII) or (VIII) bonded to one another via a bridge member are known or can be prepared analogously to known dyes.

Suitable dyes (B) which comprise two chromophore radicals of the formula (2) bonded to one another via a bridge member are, for example, the dyes of the formulae (2.5), (2.6) and (2.7)

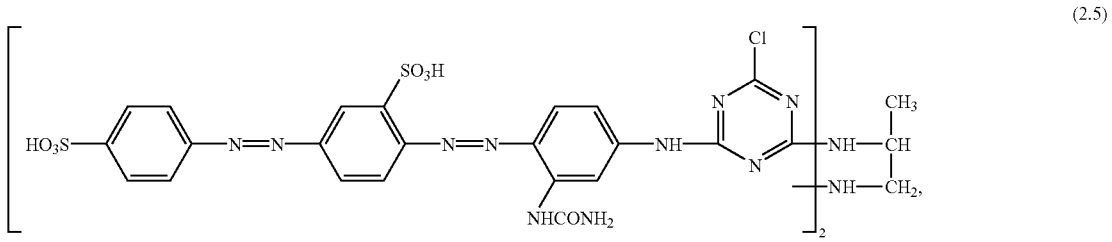

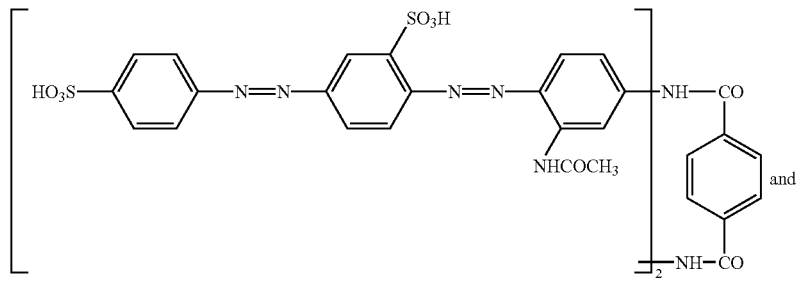

(2.6)

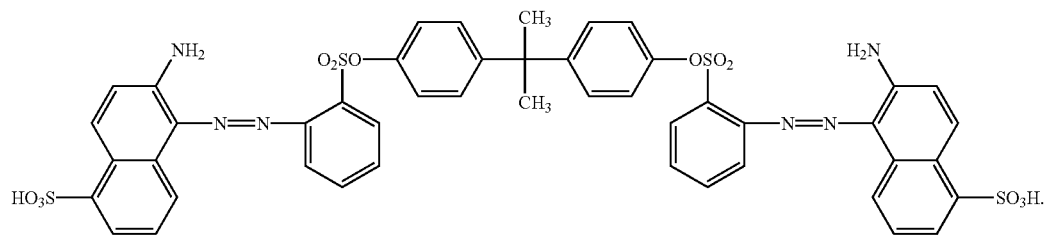

(2.7)

The dye radicals in the dye (C) are bonded to one another via a bridge member, in each case via the free valency in the formula (I), (II), (III) or (IV) and the formula (2), (3), (V), (VI), (VII) or (VIII). Bridge members are, for example, those radicals which have already been described above in connection with the dye (A) containing two radicals of the formula (I), (II), (III) or (IV).

The dyes (C) on which the inks according to the invention are based are known in some cases or can be prepared analogously to known dyes. The present invention also relates to the novel dyes (C) on which the inks according to the invention are based.

Suitable dyes (C) and dyes (B) which comprise two chromophore radicals bonded to one another via a bridge member are furthermore described, for example, in U.S. Pat. No. 5,232,462, U.S. Pat. No. 5,243,033, U.S. Pat. No. 5,410,041 and U.S. Pat. No. 5,684,138.

The radicals of the formulae (2) and (3) each contain at least one sulfo group, preferably 1 to 4 sulfo groups, in particular 1 to 3 sulfo groups, and especially 2 sulfo groups.

The dye (C) preferably contains, as the chromophore, a radical of the formula (I), (II), (III), (IVa), (IVb) or (IVc), in particular (I.1), (I.2), (I.3), (I.4), (I.5), (II.1), (II.2), (II.3), (III.1), (IVb) or (IVc).

The radicals of the formulae (2) and (3) are preferably radicals of the formula (4a), (4b), (4c), (4d), (4e), (4f), (4g), (4h), (4i), (4j), (4k), (4l), (4m), (4n), (4o), (4p), (4q), or (4r)

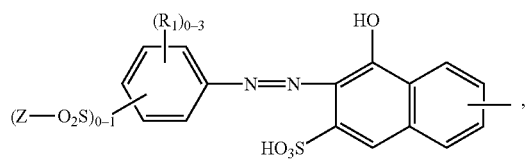

(4a)

in which $(R_1)_{0-3}$ is 0 to 3 identical or different substituents from the group consisting of $C_1$–$C_4$alkyl, $C_1$–$C_4$alkoxy, $C_2$–$C_4$alkanoylamino, halogen, carboxyl and sulfo and Z is vinyl or a radical —$CH_2$—$CH_2$—U and U is a leaving group,

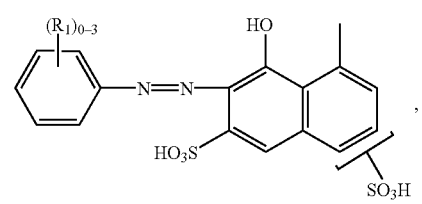

(4b)

in which $(R_1)_{0-3}$ is as defined above,

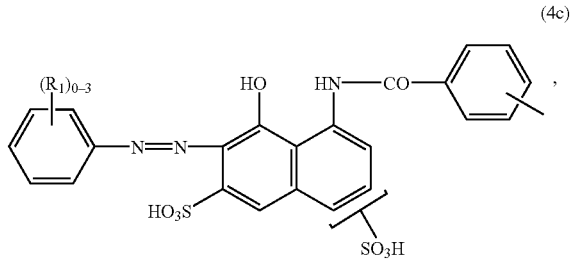

(4c)

in which $(R_1)_{0-3}$ is as defined above,

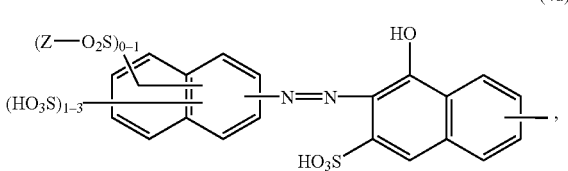

(4d)

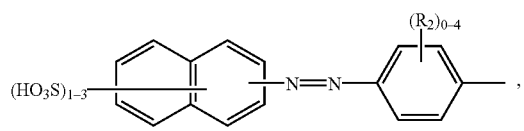
(4e)

in which $(R_2)_{0-4}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl or $C_1$–$C_4$alkoxy, amino, $C_2$–$C_4$alkanoylamino, ureido, hydroxyl, carboxyl, sulfomethyl, $C_1$–$C_4$alkylsulfonylamino and sulfo and Z is as defined above,

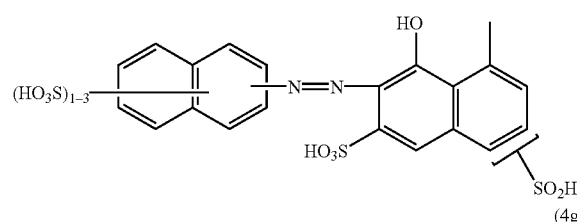
(4f)

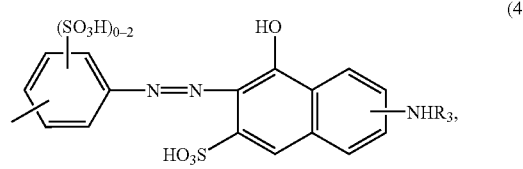
(4g)

in which $R_3$ is $C_2$–$C_4$alkanoyl or benzoyl,

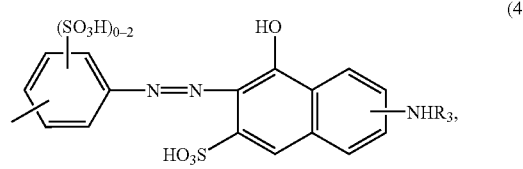
(4h)

in which $R_3$ is as defined above,

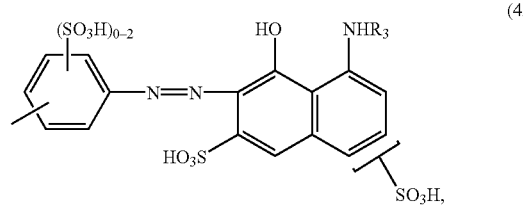
(4i)

in which $(R_4)_{0-3}$ is 0 to 3 identical or different substituents from the group consisting of $C_1$–$C_4$alkyl, $C_1$–$C_4$alkoxy, halogen, carboxyl and sulfo,

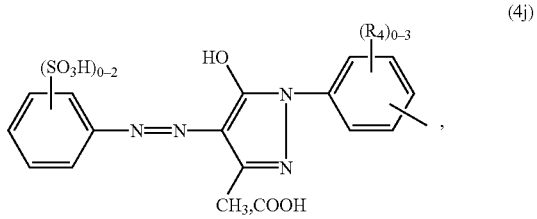
(4j)

in which $(R_4)_{0-3}$ is as defined above,

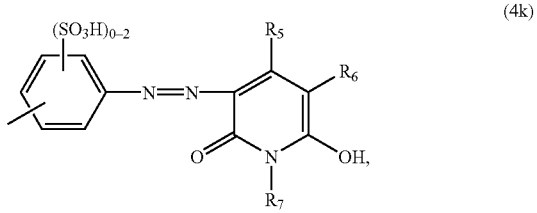
(4k)

in which $R_5$ and $R_7$ independently of one another are hydrogen, $C_1$–$C_4$alkyl or phenyl, and $R_6$ is hydrogen, cyano, carbamoyl or sulfomethyl,

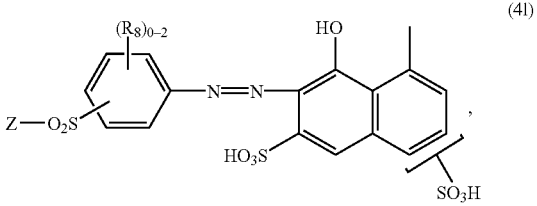
(4l)

in which $(R_8)_{0-2}$ is 0 to 2 identical or different substituents from the group consisting of $C_1$–$C_4$alkyl, $C_1$–$C_4$alkoxy, halogen, carboxyl and sulfo; and Z is as defined above,

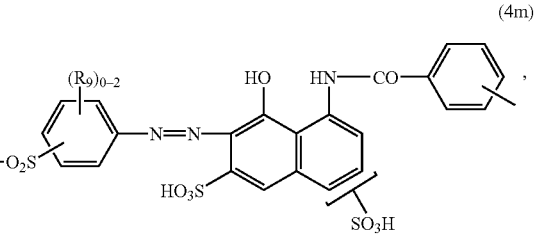
(4m)

in which $(R_9)_{0-2}$ is 0 to 2 identical or different substituents from the group consisting of $C_1$–$C_4$alkyl, $C_1$–$C_4$alkoxy, halogen, carboxyl and sulfo; and Z is as defined above,

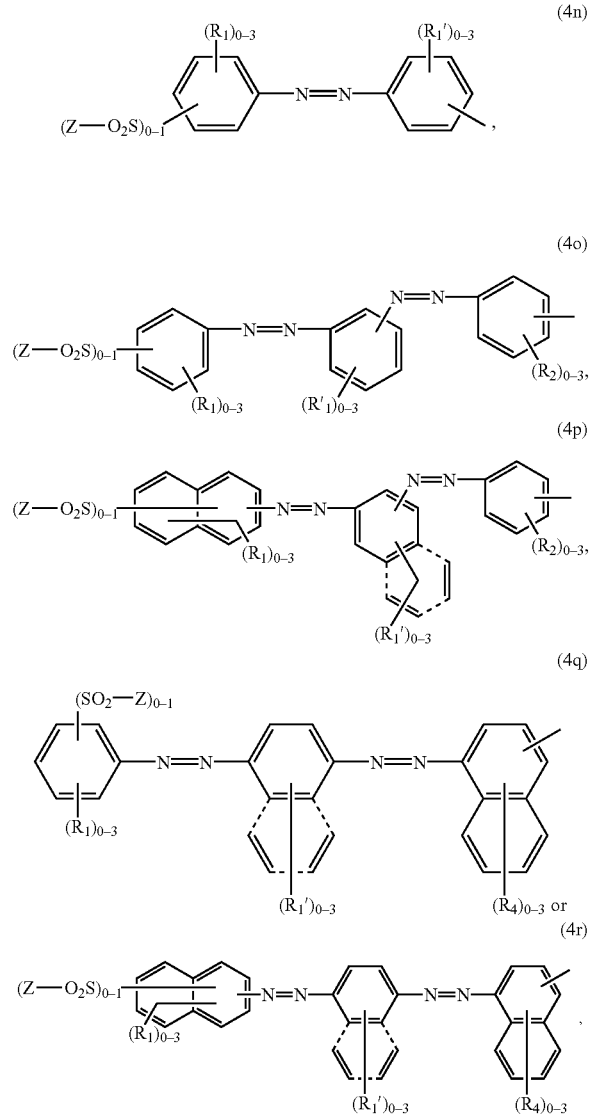

in which
$(R_1)_{0-3}$, $(R_2)_{0-3}$, $(R_4)_{0-3}$ and Z are each as defined above and $(R_1')_{0-3}$ is 0 to 3 identical or different substituents from the group consisting of $C_1$–$C_4$alkyl, $C_1$–$C_4$alkoxy, halogen, carboxyl and sulfo.

$C_1$–$C_4$alkyl $R_1$, $R_1'$, $R_2$, $R_4$, $R_5$, $R_7$, $R_8$ and $R_9$ independently of one another are, for example, methyl, ethyl, propyl, isopropyl, butyl, sec-butyl, tert-butyl or isobutyl, preferably methyl or ethyl, and in particular methyl.

$C_1$–$C_4$alkoxy $R_1$, $R_1'$, $R_2$, $R_4$, $R_8$ and $R_9$ independently of one another are, for example, methoxy, ethoxy, propoxy, isopropoxy, butoxy or isobutoxy, preferably methoxy or ethoxy, and in particular methoxy. $C_1$–$C_4$alkoxy $R_2$ is unsubstituted or substituted in the alkyl moiety by hydroxyl or $C_1$–$C_4$alkoxy, for example radicals of the formula —O—$CH_2CH_2$—OH or —O—$CH_2CH_2$—$OCH_3$.

Halogen $R_1$, $R_1'$, $R_2$, $R_4$, $R_8$ and $R_9$ independently of one another are, for example, fluorine, chlorine or bromine, preferably chlorine or bromine, and in particular chlorine.

$C_2$–$C_4$alkanoylamino $R_1$ and $R_2$ independently of one another are, for example, acetylamino or propionylamino, in particular acetylamino.

$C_2$–$C_4$-alkanoyl $R_3$ is, for example, acetyl, propionyl or butyryl, preferably acetyl or propionyl, and in particular acetyl.

$C_1$–$C_4$alkylsulfonylamino $R_2$ is, for example, methylsulfonylamino or ethylsulfonylamino, in particular methylsulfonylamino.

The leaving group U is, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. Preferably, U is a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

The radicals of the formulae (4a) to (4r) are preferably radicals which contain no fibre-reactive group. Radicals which are of particular interest are those of the formulae (4a), (4d), (4e), (4i), (4k), (4n), (4o), (4p), (4q) and (4r), in particular the radicals of the formulae (4a), (4d), (4e), (4o), (4p), (4q) and (4r). The radicals of the formulae (4e), (4o), (4p) and (4q) are of special interest.

Preferred inks are those in which the dye (A) has the formula (5)

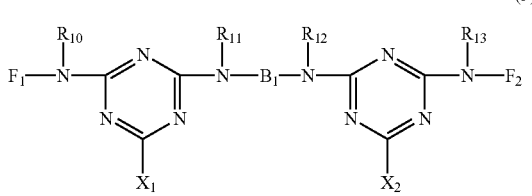

in which
$R_{10}$, $R_{11}$, $R_{12}$ and $R_{13}$ independently of one another are hydrogen or substituted or unsubstituted $C_1$–$C_4$alkyl, $B_1$ is an aliphatic or aromatic bridge member, $F_1$ and $F_2$ independently of one another are a radical of the formula (I), (II), (III) or (IV), and $X_1$ and $X_2$ independently of one another are halogen, hydroxyl, $C_1$–$C_4$alkoxy which is unsubstituted or substituted in the alkyl moiety, phenoxy which is unsubstituted or substituted in the phenyl ring, $C_1$–$C_4$alkylthio which is unsubstituted or substituted in the alkyl moiety, phenylthio which is unsubstituted or substituted in the phenyl ring, amino, N-mono- or N,N-di-$C_1$–$C_6$alkylamino which are unsubstituted or substituted in the alkyl moiety, $C_5$–$C_7$-cycloalkylamino which is unsubstituted or substituted in the cycloalkyl ring, phenyl- or naphthylamino or N—$C_1$–$C_4$alkyl-N-phenyl- or N—$C_1$–$C_4$alkyl-N-naphthylamino which are unsubstituted or substituted in the aryl moiety, benzylamino which is unsubstituted or substituted in the phenyl moiety, morpholino or piperidin-1-yl.

Preferred inks are those in which the dye (B) has the formula (6)

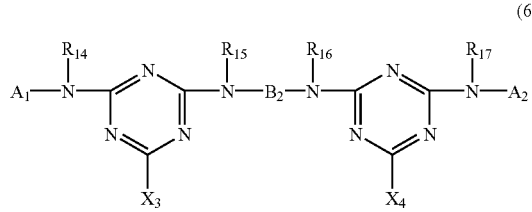

and the dye (C) has the formula (7)

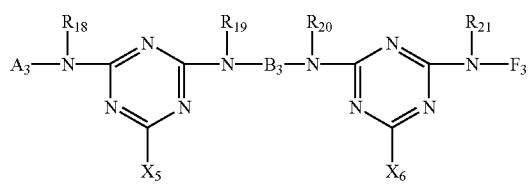

in which
$R_{14}$, $R_{15}$, $R_{16}$, $R_{17}$, $R_{18}$, $R_{19}$, $R_{20}$ and $R_{21}$ independently of one another are hydrogen or substituted or unsubstituted $C_1$–$C_4$alkyl,
$B_2$ and $B_3$ independently of one another are an aliphatic or aromatic bridge member,
$A_1$, $A_2$ and $A_3$ independently of one another are a mono- or disazo radical containing sulfo groups or a radical of the formula (V), (VI) or (VII),
$F_3$ is a radical of the formula (I), (II), (III) or (IV) and
$X_3$, $X_4$, $X_5$ and $X_6$ independently of one another are halogen, hydroxyl, $C_1$–$C_4$alkoxy which is unsubstituted or substituted in the alkyl moiety, phenoxy which is unsubstituted or substituted in the phenyl ring, $C_1$–$C_4$alkylthio which is unsubstituted or substituted in the alkyl moiety, phenylthio which is unsubstituted or substituted in the phenyl ring, amino, N-mono- or N,N-di-$C_1$–$C_6$alkylamino which are unsubstituted or substituted in the alkyl moiety, $C_5$–$C_7$-cycloalkylamino which is unsubstituted or substituted in the cycloalkyl ring, phenyl- or naphthylamino or N—$C_1$–$C_4$alkyl-N-phenyl- or N—$C_1$–$C_4$alkyl-N-naphthylamino which are unsubstituted or substituted in the aryl moiety, benzylamino which is unsubstituted or substituted in the phenyl moiety, morpholino or piperidin-1-yl.

Alkyl radicals $R_{10}$, $R_{11}$, $R_{12}$, $R_{13}$, $R_{14}$, $R_{15}$, $R_{16}$, $R_{17}$, $R_{18}$, $R_{19}$, $R_{20}$ and $R_{21}$ are straight-chain or branched. The alkyl radicals can be further substituted, for example by hydroxyl, sulfo, sulfato, cyano or carboxyl. Examples are the following radicals: methyl, ethyl, propyl, isopropyl, butyl, isobutyl, sec-butyl or tert-butyl, and the corresponding radicals substituted by hydroxyl, sulfo, sulfato, cyano or carboxyl. Preferred substituents are hydroxyl, sulfo, sulfato or carboxyl, in particular hydroxyl or sulfato, and preferably hydroxyl.

Aliphatic bridge members $B_1$, $B_2$ and $B_3$ are, for example, a $C_2$–$C_{12}$alkylene radical, in particular a $C_2$–$C_6$alkylene radical, which can be interrupted by 1, 2 or 3 members from the II=group consisting of —NH—, —N(CH$_3$)— or, in particular, —O— and is unsubstituted or substituted by hydroxyl, sulfo, sulfato, cyano or carboxyl. Preferred substituents of the alkylene radicals mentioned for $B_1$, $B_2$ and $B_3$ are hydroxyl, sulfo or sulfato, in particular hydroxyl.

Aliphatic bridge members $B_1$, $B_2$ and $B_3$ are furthermore, for example, $C_5$–$C_9$-cycloalkylene radicals, such as, in particular, cyclohexylene radicals. The cycloalkylene radicals mentioned can be unsubstituted or substituted by $C_1$–$C_4$alkyl, $C_1$–$C_4$alkoxy, $C_2$–$C_4$alkanoylamino, sulfo, halogen or carboxyl, in particular by $C_1$–$C_4$alkyl. Aliphatic bridge members $B_1$, $B_2$ and $B_3$ are furthermore methylenecyclohexylene, ethylene-cyclohexylene or methylene-cyclohexylene-methylene radicals which are unsubstituted or substituted in the cyclohexylene ring by $C_1$–$C_4$alkyl, in particular methyl.

The radicals of the formulae —N($R_{11}$)—$B_1$—N($R_{12}$)—, —N($R_{15}$)—$B_2$—N($R_{16}$)— and —N($R_{19}$)—$B_3$—N($R_{20}$)— can also be, for example, a radical of the formula

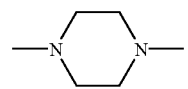

or,

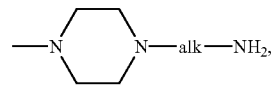

in which alk is, for example, $C_1$–$C_4$alkylene, for example ethylene.

Aromatic bridge members $B_1$, $B_2$ and $B_3$ are $C_1$–$C_6$alkylenephenylene, such as methylenephenylene, $C_1$–$C_4$alkylenephenylene-$C_1$–$C_4$alkylene, for example methylenephenylenemethylene, or phenylene which are unsubstituted or substituted by $C_1$–$C_4$alkyl, $C_1$–$C_4$alkoxy, $C_2$–$C_4$alkanoylamino, sulfo, halogen or carboxyl, or a radical of the formula

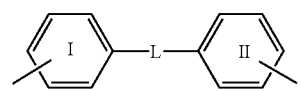

in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and L is the direct bond or a $C_2$–$C_{10}$alkylene radical, which can be interrupted by 1, 2 or 3 oxygen atoms, or L is a bridge member of the formula —CH═CH—, —N═N—, —NH—, —CO—, —NH—CO—, —NH—SO$_2$—NH—CO—NH—, —O—, —S— or —SO$_2$—. Aromatic bridge members $B_1$, $B_2$ and $B_3$ are preferably phenylene, which can be substituted as mentioned above. Preferably, the aromatic bridge members $B_1$, $B_2$ and $B_3$ are unsubstituted or substituted by sulfo.

$B_1$, $B_2$ and $B_3$ are preferably a $C_2$–$C_{12}$alkylene radical, which can be interrupted by 1, 2 or 3 members from the group consisting of —NH—, —N(CH$_3$)— or —O— and is unsubstituted or substituted by hydroxyl, sulfo, sulfato, cyano or carboxyl; or a $C_5$–$C_9$cycloalkylene radical, $C_1$–$C_6$alkylenephenylene radical or phenylene radical which are unsubstituted or substituted by $C_1$–$C_4$alkyl, $C_1$–$C_4$alkoxy, $C_2$–$C_4$alkanoylamino, sulfo, halogen or carboxyl; or $B_1$, $B_2$ and $B_3$ are a radical of the formula (8), in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and L is the direct bond or a $C_2$–$C_{10}$alkylene radical, which can be interrupted by 1, 2 or 3 oxygen atoms, or L is a bridge member of the formula —CH=CH—, —N=N—, —NH—, —CO—, —NH—CO—, —NH—SO$_2$—, —NH—CO—NH—, —O—, —S— or —SO$_2$— ist;

or the radicals of the formulae —N($R_{11}$)—$B_1$—N($R_{12}$)—, —N($R_{15}$)—$B_2$—N($R_{16}$)— and —N($R_{19}$)—$B_1$—N($R_{20}$)— are a piperazine radical of the formula

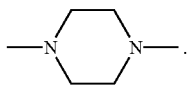

$B_1$, $B_2$ and $B_3$ are particularly preferably a $C_2$–$C_{12}$alkylene radical, which can be interrupted by 1, 2 or 3 members —O— and is unsubstituted or substituted by hydroxyl, sulfo, sulfato, cyano or carboxyl, or a phenylene radical which is unsubstituted or substituted by $C_1$–$C_4$alkyl, $C_1$–$C_4$alkoxy, $C_2$–$C_4$alkanoylamino, sulfo, halogen or carboxyl.

$B_1$, $B_2$ and $B_3$ are especially preferably a $C_2$–$C_{12}$alkylene radical, in particular a $C_2$–$C_6$alkylene radical, which can be interrupted by 1, 2 or 3 members —O— and is unsubstituted or substituted by hydroxyl or sulfato.

Bridge members $B_1$, $B_2$ and $B_3$ of particular interest are $C_2$–$C_6$alkylene radicals, in particular those of the formula —CH$_2$—CH($R_{22}$)— or —($R_{22}$)—CH—CH$_2$—, in which $R_{22}$ is $C_1$–$C_4$alkyl, in particular methyl.

Halogen $X_1$, $X_2$, $X_3$, $X_4$, $X_5$ and $X_6$ independently of one another are, for example, fluorine, chlorine or bromine, preferably fluorine or chlorine, and in particular chlorine.

$C_1$–$C_4$alkoxy $X_1$, $X_2$, $X_3$, $X_4$, $X_5$ and $X_6$ independently of one another are, for example, methoxy, ethoxy, propoxy, isopropoxy, butoxy, sec-butoxy, isobutoxy or tert-butoxy, in particular methoxy or ethoxy. The radicals mentioned are unsubstituted or substituted in the alkyl moiety, for example by $C_1$–$C_4$alkoxy, for example methoxy or ethoxy, hydroxyl, sulfo or carboxyl.

$C_1$–$C_4$alkylthio $X_1$, $X_2$, $X_3$, $X_4$, $X_5$ and $X_6$ independently of one another are, for example, methylthio, ethylthio, propylthio, isopropylthio or butylthio. The radicals mentioned are unsubstituted or substituted in the alkyl moiety, for example by $C_1$–$C_4$alkoxy, for example methoxy or ethoxy; hydroxyl; sulfo or carboxyl. The radicals substituted in the alkyl moiety by one or two radicals from the group consisting of hydroxyl, sulfo and carboxyl are preferred.

N-mono- or N,N-di-$C_1$–$C_6$alkylamino, preferably N-mono- or N,N-di-$C_1$–$C_4$alkylamino, $X_1$, $X_2$, $X_3$, $X_4$, $X_5$ and $X_6$ independently of one another are, for example, N-methylamino, N-ethylamino, N-propylamino, N-butylamino, N-hexylamino, N,N-dimethylamino or N,N-di-ethylamino. The radicals mentioned are unsubstituted or substituted in the alkyl moiety, for example by $C_2$–$C_4$alkanoylamino, for example acetylamino or propionylamino; $C_1$–$C_4$alkoxy, for example methoxy or ethoxy; hydroxyl; sulfo; sulfato; carboxyl; carbamoyl; sulfamoyl or β-sulfatoethylsulfonyl. The radicals mentioned are uninterrupted or interrupted in the alkyl moiety by oxygen. Examples of radicals which are substituted in the alkyl moiety and which are interrupted in the alkyl moiety by oxygen are N-β-hydroxyethylamino, N,N-diβ-hydroxyethylamino, N-2-(β-hydroxyethoxy)-ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxyethylamino, N-α,γ-dicarboxypropylamino, N-ethyl-N-β-hydroxyethylamino and N-methyl-N-β-hydroxyethylamino. The radicals which are substituted in the alkyl moiety by hydroxyl; sulfo; sulfato; carboxyl or carbamoyl are preferred.

$C_5$–$C_7$cycloalkylamino $X_1$, $X_2$, $X_3$, $X_4$, $X_5$ and $X_6$ independently of one another can include both the unsubstituted radicals and the radicals which are substituted in the cycloalkl ring, for example by $C_1$–$C_4$alkyl, for example methyl or ethyl, in particular methyl, or carboxyl. Preferred such radicals are the corresponding cyclohexyl radicals.

Phenylamino or N—$C_1$–$C_4$alkyl-N-phenylamino, preferably phenylamino, $X_1$, $X_2$, $X_3$, $X_4$, $X_5$ and $X_6$ independently of one another can include both the unsubstituted radicals and the radicals which are substituted in the phenyl ring, for example by $C_1$–$C_4$alkyl, for example methyl or ethyl, which is unsubstituted or further substituted, for example by carboxyl; $C_1$–$C_4$alkoxy, for example methoxy or ethoxy; carboxyl; carbamoyl; N—$C_1$–$C_4$alkylcarbamoyl, which is unsubstituted or further substituted in the alkyl moiety, for example by carboxyl, for example N-carboxymethylcarbamoyl; sulfo or halogen, for example chlorine or bromine. The substituted radicals, preferably the radicals substituted by carboxyl, carboxymethyl, N-carboxymethylcarbamoyl or sulfo, in particular sulfo, are preferred.

Naphthylamino or N—$C_1$–$C_4$alkyl-N-naphthylamino, preferably naphthylamino, $X_1$, $X_2$, $X_3$, $X_4$, $X_5$ and $X_6$ independently of one another can include both the unsubstituted radicals and the radicals substituted in the naphthyl ring, for example by sulfo. The radicals substituted by 1 to 3, in particular 2 to 3, sulfo groups are preferred.

Benzylamino $X_1$, $X_2$, $X_3$, $X_4$, $X_5$ and $X_6$ which are unsubstituted or substituted in the phenyl moiety independently of one another can include both the unsubstituted radicals and the radicals substituted in the phenyl ring, for example by $C_1$–$C_4$alkyl, for example methyl or ethyl; $C_1$–$C_4$alkoxy, for example methoxy or ethoxy; carboxyl; sulfo or halogen, for example chlorine or bromine. The radicals substituted in the phenyl ring by carboxyl are preferred.

$X_1$, $X_2$, $X_3$, $X_4$, $X_5$ and $X_6$ are preferably halogen, $C_1$–$C_4$alkoxy, or alkylthio which are unsubstituted or substituted in the alkyl moiety by $C_1$–$C_4$alkoxy, hydroxyl, sulfo or carboxyl, N-mono, or N,N-di-$C_1$–$C_4$alkylamino which are unsubstituted or substituted in the alkyl moiety by $C_2$–$C_4$alkanoylamino, $C_1$–$C_4$alkoxy, hydroxyl, sulfo, sulfato, carboxyl, carbamoyl or sulfamoyl, $C_5$–$C_7$-cycloalkylamino which is unsubstituted or substituted by $C_1$–$C_4$alkyl or carboxyl, phenylamino or N—$C_1$–$C_4$alkyl-N-phenylamino which are unsubstituted or substituted in the phenyl moiety by $C_1$–$C_4$alkyl, which is unsubstituted or further substituted by carboxyl, $C_1$–$C_4$alkoxy, carboxyl, carbamoyl, N—$C_1$–$C_4$alkylcarbamoyl, which is unsubstituted or further substituted in the alkyl moiety by carboxyl, sulfo or halogen, naphthylamino which is substituted in the aryl moiety by sulfo, or benzylamino which is unsubstituted or substituted in the phenyl moiety by $C_1$–$C_4$alkyl, $C_1$–$C_4$alkoxy, carboxyl, sulfo or halogen.

$X_1$, $X_2$, $X_3$, $X_4$, $X_5$ and $X_6$ particularly preferably independently of one another are halogen, $C_1$–$C_4$alkylthio which is unsubstituted or substituted in the alkyl moiety by hydroxyl, sulfo or carboxyl, in particular sulfo or carboxyl, N-mono- or N,N-di-$C_1$–$C_4$alkylamino which is unsubstituted or substituted in the alkyl moiety by $C_2$–$C_4$alkanoylamino, $C_1$–$C_4$alkoxy, hydroxyl, sulfo, sulfato, carboxyl or carbamoyl, in particular hydroxyl, sulfo or carboxyl, or morpholino.

$R_{10}$, $R_{13}$, $R_{14}$, $R_{17}$, $R_{18}$ and $R_{21}$ are preferably hydrogen or $C_1$–$C_4$alkyl, in particular hydrogen.

$R_{11}$, $R_{12}$, $R_{15}$, $R_{16}$, $R_{19}$ and $R_{20}$ are preferably hydrogen or $C_1$–$C_4$alkyl which is unsubstituted or substituted by hydroxyl, sulfo, sulfato or carboxyl, preferably hydrogen or $C_1$–$C_4$alkyl, and in particular hydrogen.

The radicals $F_1$ and $F_2$ in the dye of the formula (5) can be different or identical. Preferably, the radicals $F_1$ and $F_2$ are identical.

The radicals $A_1$ and $A_2$ in the dye of the formula (6) can be different or identical. Preferably, the radicals $A_1$ and $A_2$ are identical.

The radicals $X_1$ and $X_2$ in the dye of the formula (5) can be different or identical. Preferably, the radicals $X_1$ and $X_2$ are identical.

The radicals $X_3$ and $X_4$ in the dye of the formula (6) can be different or identical. Preferably, the radicals $X_3$ and $X_4$ are identical.

The radicals $X_5$ and $X_6$ in the dye of the formula (7) can be different or identical. Preferably, the radicals $X_5$ and $X_6$ are identical.

Preferred inks are those in which the dye (A) has the formula (5), the dye (B) has the formula (6) and the dye (C) has the formula (7), in which $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $B_1$, $B_2$, $B_3$, $F_1$, $F_2$, $F_3$, $A_1$, $A_2$, $A_3$, $X_1$, $X_2$, $X_3$, $X_4$, $X_5$ and $X_6$ are as defined and preferred above under formulae (5), (6) and (7).

Particularly preferred inks are those in which the dye (A) has the formula (5), the dye (B) has the formula (6) and the dye (C) has the formula (7), in which $R_{10}$, $R_{11}$, $R_{12}$, $R_{13}$, $R_{14}$, $R_{15}$, $R_{16}$, $R_{17}$, $R_{18}$, $R_{19}$, $R_{20}$ and $R_{21}$ are hydrogen, $B_1$, $B_2$ and $B_3$ independently of one another are a radical of the formula —$CH_2$—$CH(R_{22})$— or —$(R_{22})$—$CH$—$CH_2$—, in which $R_{22}$ is $C_1$–$C_4$alkyl, in particular methyl, $F_1$, $F_2$ and $F_3$ independently of one another are a radical of the formula (I), (II), (III), (IVa), (IVb) or (IVc), in particular (I.1), (I.2), (I.3), (I.4), (I.5), (II.1), (II.2), (II.3), (III.1), (IVb) or (IVc), $A_1$, $A_2$ and $A_3$ independently of one another are a radical of the formula (4a), (4b), (4c), (4d), (4e), (4f), (4g), (4h), (4i), (4j), (4k), (4l), (4m), (4n), (4o), (4p), (4q), (4r), (V), (VI) or (VII), preferably (4a), (4d), (4e), (4o), (4p), (4q), (4r), (V), (VI) or (VII), and in particular (4e), (4o), (4p), (4q), (V), (VI) or (VII), which contain no fibre-reactive substituents, and $X_1$, $X_2$, $X_3$, $X_4$, $X_5$ and $X_6$ independently of one another are halogen, $C_1$–$C_4$alkylthio which is unsubstituted or substituted in the alkyl moiety by hydroxyl, sulfo or carboxyl, in particular sulfo or carboxyl, N-mono- or N,N-di-$C_1$–$C_4$alkylamino which are unsubstituted or substituted in the alkyl moiety by $C_2$–$C_4$alkanoylamino, $C_1$–$C_4$alkoxy, hydroxyl, sulfo, sulfato, carboxyl or carbamoyl, in particular hydroxyl, sulfo or carboxyl, or morpholino.

A particularly preferred embodiment of the present invention comprises inks which comprise at least one dye (A) of the formula (5) together with at least one dye (C) of the formula (7), in which $R_{10}$, $R_{11}$, $R_{12}$, $R_{13}$, $R_{18}$, $R_{19}$, $R_{20}$, $R_{21}$, $B_1$, $B_3$, $F_1$, $F_2$, $F_3$, $A_3$, $X_1$, $X_2$, $X_5$, and $X_6$ are as defined and preferred above.

Further suitable dyes (C) for the inks according to the invention have the formula (9)

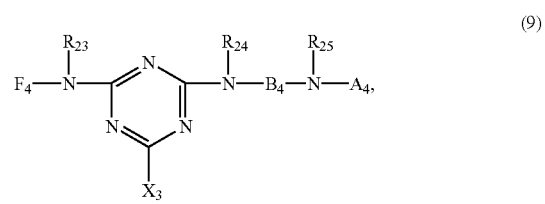

in which $R_{23}$ is as defined and preferred for $R_{10}$, $R_{13}$, $R_{14}$, $R_{17}$, $R_{18}$ and $R_{21}$, $R_{24}$ and $R_{25}$ independently of one another are as defined and preferred for $R_{11}$, $R_{12}$, $R_{15}$, $R_{16}$, $R_{19}$ and $R_{20}$, $B_4$ is as defined and preferred for $B_1$, $B_2$ and $B_3$, $A_4$ is a radical of the formula (VIII), $F_4$ is as defined and preferred for $F_1$, $F_2$ and $F_3$ and $X_7$ is as defined and preferred for $X_1$, $X_2$, $X_3$, $X_4$, $X_5$ and $X_6$.

The inks according to the invention preferably comprise 30 to 95% by weight of at least one dye (A) together with 5 to 70% by weight of at least one dye chosen from the group consisting of (B) and (C), based on the total weight of dyes (A), (B) and (C) in the ink.

If the ink according to the invention comprises at least one dye (A) together with at least one dye (B), the dye (A) is present, for example, in an amount of 60 to 95% by weight, preferably 70 to 95% by weight, in particular 75 to 90% by weight, and the dye (B) is present, for example, in an amount of 5 to 40% by weight, preferably 5 to 30% by weight, and in particular 10 to 25% by weight, based on the total weight of the dyes (A) and (B) in the ink.

If the ink according to the invention comprises at least one dye (A) together with at least one dye (C), the dye (A) is present, for example, in an amount of 25 to 90% by weight, preferably 30 to 80% by weight, and in particular 30 to 70% by weight, and the dye (C) is present, for example, in an amount of 10 to 75% by weight, preferably 20 to 70% by weight, and in particular 30 to 70% by weight, based on the total weight of the dyes (A) and (C) in the ink.

The inks according to the invention can comprise further dyes for shading, in addition to the abovementioned dyes. Preferably, the inks comprise no substantial amounts of a further dye which does not fall under the definition according to the claims of the dyes in the inks according to the invention. "Substantial amounts" in this connection is to be understood as meaning, for example, amounts of more than 5% by weight, based on the total weight of the dyes (A), (B) and (C) in the ink.

The dyes used in the inks according to the invention should preferably have a low salt content, i.e. comprise a total content of salts of less than 0.5% by weight, based on the weight of the dyes. Dyes which have relatively high salt content due to their preparation and/or the subsequent addition of diluents can be desalinated, for example, by membrane separation processes, such as ultrafiltration, reverse osmosis or dialysis.

The inks preferably comprise a total content of dyes of 1 to 35% by weight, in particular 1 to 30% by weight, and preferably 1 to 20% by weight, based on the total weight of ink. A limit of 2.5% by weight, in particular 5% by weight, and preferably 7.5% by weight, is preferred here as the lower limit.

Those inks which have a viscosity of 1 to 40 mPas (millipascal-seconds) are preferred.

The inks comprise water-miscible solvents in an amount of 1 to 40% by weight, for example $C_1$–$C_4$ alcohols, for example methanol, ethanol, n-propanol, isopropanol, n-butanol, sec-butanol, tert-butanol or isobutanol; amides, for example dimethylformamide or dimethylacetamide, ketones or ketone alcohols, for example acetone or diacetone alcohol; ethers, for example tetrahydrofuran or dioxane; nitrogen-containing heterocyclic compounds, for example N-methyl-2-pyrrolidone or 1,3-dimethyl-2-imidazolidone, polyalkylene glycols, for example polyethylene glycol or polypropylene glycol; $C_2$–$C_6$alkylene glycols and thioglycols, for example ethylene glycol, propylene glycol, butylene glycol, triethylene glycol, thiodiglycol, hexylene glycol and diethylene glycol; further polyols, for example glycerol or 1,2,6-hexanetriol; and $C_1$–$C_4$alkyl ethers of polyhydric alcohols, for example 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or, in particular, 1,2-propylene glycol, preferably in an amount of 2 to 30% by weight, in particular 5 to 30% by weight, and especially 10 to 25% by weight, based on the total weight of the ink.

The inks can furthermore also comprise solubilizing agents, for example ε-caprolactam.

The inks can comprise thickeners of natural or synthetic origin, inter alia for the purpose of adjusting the viscosity.

Examples of thickeners are commercially available alginate thickeners, starch ethers or carob bean flower ethers, in particular sodium alginate, by itself or as a mixture with modified cellulose, for example methyl-, ethyl-, carboxymethyl-, hydroxyethyl-, methylhydroxyethyl-, hydroxypropyl- or hydroxypropylmethylcellulose, in particular with preferably 20 to 25% by weight of carboxymethylcellulose. Synthetic thickeners are furthermore, for example, those based on poly(meth)acrylic acids or poly(meth)acrylamides.

The inks comprise such thickeners, for example, in an amount of 0.01 to 2% by weight, in particular 0.01 to 1% by weight, and preferably 0.01 to 0.5% by weight, based on the total weight of the ink.

The inks can furthermore comprise buffer substances, for example borax, borate, phosphate, polyphosphate or citrate. Examples are borax, sodium borate, sodium tetraborate, sodium dihydrogenphosphate, disodium hydrogen phosphate, sodium tripolyphosphate, sodium tripolyphosphate, sodium pentaphosphate and sodium citrate. They are used, in particular, in amounts of 0.1 to 3% by weight, preferably 0.1 to 1% by weight, based on the total weight of the ink, in order to establish a pH of, for example, 4 to 10, preferably 5 to 8.

The inks can comprise surfactants or humectants as further additives.

Surfactants are the commercially available anionic or nonionic surfactants. Humectants are, for example, urea, glycerol, propylene glycol or a mixture of sodium lactate (advantageously in the form of a 50 to 60% aqueous solution) and glycerol and/or propylene glycol in amounts of preferably 0.1 to 30% by weight, in particular 2 to 30% by weight, in the inks according to the invention.

If desired, the inks can also comprise acid donors, such as butyrolactone or sodium hydrogen phosphate, preservatives, substances which inhibit fungal and/or bacterial growth, foam suppressants, sequestering agents, emulsifiers, water-insoluble solvents, oxidizing agents or de-aerating agents.

Preservatives are, in particular, formaldehyde-releasing agents, for example paraformaldehyde and trioxane, in particular aqueous, approximately 30 to 40% by weight formaldehyde solutions, sequestering agents are, for example, sodium nitrilotriacetate, sodium ethylenediaminetetraacetate, and in particular sodium polymetaphosphate, especially sodium hexametaphosphate, emulsifiers are, in particular, adducts of an alkylene oxide and a fatty alcohol, in particular an adduct of oleyl alcohol and ethylene oxide, water-insoluble solvents are high-boiling saturated hydrocarbons, in particular paraffins with a boiling range from about 160 to 210° C. (so-called white spirits) oxidizing agents are, for example, an aromatic nitro compound, in particular an aromatic mono- or dinitrocarboxylic acid or -sulfonic acid, which may be present as an alkylene oxide adduct, in particular a nitrobenzenesulfonic acid, and de-aerating agents are, for example, high-boiling solvents, in particular terpentine oils, higher alcohols, preferably $C_8$ to $C_{10}$ alcohols, terpene alcohols or de-aerating agents based on mineral and/or silicone oils, in particular commercial formulations of about 15 to 25% by weight of a mixture of mineral oil and silicone oil and about 75 to 85% by weight of a $C_8$ alcohol, for example 2-ethyl-n-hexanol. These are usually used in amounts of 0.01 to 5% by weight based on the total weight of the ink.

The inks can be prepared in the customary manner by mixing the individual constituents into the desired amount of water. If necessary, the inks are clarified by filtration through an extra-fine filter.

The inks according to the invention are suitable, for example, for printing. Examples of appropriate printing processes are conventional printing, screen printing and ink-jet printing processes.

The inks according to the invention are particularly suitable for use in recording systems of a type in which an ink is pressed out of a small opening in the form of droplets directed against a substrate on which an image is formed. Suitable substrates are, for example, textile fibre materials, paper or films of plastic. Suitable recording systems are, for example, commercially available ink-jet printers for use in printing of paper or textiles, or writing implements, such as fountain pens or ball-point pens, and in particular ink-jet printers.

It may be necessary, for example, to adjust the viscosity or other physical properties of the ink, in particular those which have an influence on the affinity for the particular substrate, according to the method of use.

The inks according to the invention which comprise dyes with fibre-reactive radicals are thus suitable for use in the printing of paper or textiles.

Inks which comprise dyes without fibre-reactive radicals are particularly suitable for recording on paper, and especially for use in the printing of paper.

Textile fibre materials are, in particular, fibre materials containing nitrogen or containing hydroxyl groups, for example textile fibre materials of cellulose, silk, wool or synthetic polyamides.

Examples of paper which can be printed with the inks according to the invention are commercially available ink-jet paper, photographic paper, glazed paper and paper coated with plastic, for example Epson Ink-Jet Paper, Epson Photo Paper, Epson Glossy Film, HP Special Ink-Jet Paper, Encad Photo Gloss Paper and Ilford Photo Paper. Films of plastic which can be printed with the inks according to the invention are, for example, transparent or milky/opaque. Suitable films of plastic are, for example, 3M Transparency-Film.

The present inventious also relates to a process for printing paper, films of plastic or textile fibre materials, in particular by the ink-jet printing process, which comprises using an aqueous ink which comprises
20 to 95% by weight of at least one dye (A) together with
  5 to 80% by weight of at least one dye chosen from the group consisting of (B) and (C), based on the total weight of the dyes (A), (B) and (C) in the ink, and
1 to 40% by weight of a water-miscible organic solvent, based on the total weight of the ink, wherein
the dyes (A), (B) and (C) are as defined and preferred above.

In the case of the ink-jet printing process, individual drops of the ink are sprayed out of a jet in a controlled manner onto a substrate. The continuous ink-jet method and the drop-on-demand method are chiefly used for this. In the case of the continuous ink-jet method, the drops are produced continuously, drops which are not required for printing being diverted into a collecting container and recycled. In the case of the drop-on-demand method, on the other hand, drops are produced and printed as required, i.e. drops are only produced if this is necessary for printing. The drops can be produced, for example, by means of a piezo ink-jet head or by means of thermal energy (bubble jet). Printing by means of a piezo ink-jet head is preferred for the process according to the invention. Printing by the continuous ink-jet method is furthermore preferred for the process according to the invention.

The records produced, such as, for example, prints, are distinguished by good black shades without a change in shade in artificial light (metamerism) with an outstanding fastness to light. Records which are produced with inks comprising a dye (A) together with a dye (C) show no "orange bleeding" of the black shade.

The present invention also relates to black-dyeing dye mixtures which comprise 20 to 95% by weight of at least one dye (A) together with 5 to 80% by weight of at least one dye chosen from the group consisting of (B) and (C), based on the total weight of the dyes (A), (B) and (C) in the dye mixture, where the dye (A) has the formula (5), the dye (B) has the formula (6) and the dye (C) has the formula (7), in which the radicals $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $B_1$, $B_2$, $B_3$, $F_1$, $F_2$, $F_3$, $A_1$, $A_2$, $A_3$, $X_1$, $X_2$, $X_3$, $X_4$, $X_5$ and $X_6$ are as defined and preferred above under the formulae (5), (6) and (7).

The dye mixtures according to the invention can be prepared, for example, by mixing the individual dyes. This mixing process is carried out, for example, in suitable mills, for example ball or pinned disc mills, and in kneaders or mixers.

The dye mixtures according to the invention in which the dye (A) has the formula (5), the dye (B) has the formula (6) and the dye (C) has the formula (7) and the radicals $R_{10}$, $R_{13}$ and $R_{21}$; $R_{11}$, $R_{12}$, $R_{15}$, $R_{16}$, $R_{19}$ and $R_{20}$; $R_{14}$, $R_{17}$ and $R_{18}$; $B_1$, $B_2$ and $B_3$; $F_1$, $F_2$ and $F_3$; $A_1$, $A_2$ and $A_3$ and $X_1$, $X_2$, $X_3$, $X_4$, $X_5$ and $X_6$ in each case have identical meanings, can be prepared by reacting the compounds of the formulae (10a) and (10b)

(10a)

and

(10b)

or corresponding dye intermediates, a halogenotriazine compound of the formula (11)

(11)

and a diamine of the formula (12)

(12)

in which $A_1$, $F_1$, $R_{10}$, $R_{11}$, $R_{12}$ and $R_{14}$ are as defined under the formulae (5) and (6), and X is halogen, for example fluorine or chlorine, with one another in any sequence and, in the case where dye intermediates are used, the resulting intermediate products are converted into the desired dyes, and, if appropriate, a further reaction with a compound of the formula (13)

(13)

in which $X_1$ is as defined under the formula (5), with the exception of halogen, follows.

The preparation of the end dyes from the intermediates is, in particular, coupling reactions which lead to azo dyes.

Since the individual process steps described above can be carried out in a different sequence, and in some cases also at the same time, if appropriate, various process variants are possible. In general, the reaction is carried out stepwise in succession, the sequence of the simple reactions between the individual reaction components advantageously depending on the particular conditions.

One process variant comprises reacting the compounds of the formulae (10a) and (10b) independently of one another with in each case an approximately equivalent amount of a halogenotriazine compound of the formula (11) to give the compounds of the formulae (14a) and (14b)

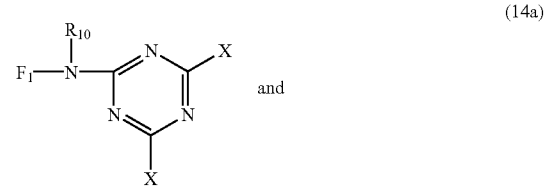
(14a)

and

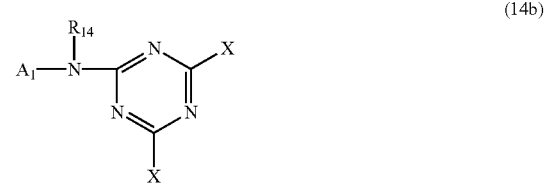
(14b)

and then subjecting a mixture of approximately two molar equivalents of the compounds of the formulae (14a) and (14b) to a condensation reaction with approximately one molar equivalent of a diamine of the formula (12) and, if appropriate, following this condensation step with a further reaction with a compound of the formula (13).

The ratio of the dyes of the formulae (5), (6) and (7) in the mixture can vary in the range stated and depends here on the ratio of the compounds of the formulae (14a) and (14b) in the reaction mixture.

The individual condensation reactions are carried out, for example, by processes which are known per se, as a rule in aqueous solution at a temperature of, for example, 0 to 50° C. and a pH of, for example, 4 to 10.

The present invention relates to a process for the preparation of the dye mixtures according to the invention which do not comprise substantial amounts of a compound of the formula (6), which comprises (i) reacting the compounds of the formulae (10a) and (10b) independently of one another with in each case a halogenotriazine compound of the formula (11) to give the compounds of the formulae (14a) and (14b), (ii) reacting the compound of the formula (14b) with an excess of a diamine of the formula (12) such that a mixture of the compounds of the formulae (12) and (15)

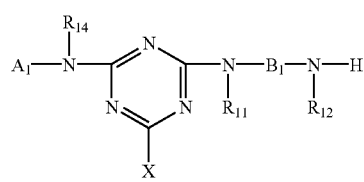

is obtained, (iii) subjecting this mixture to a condensation reaction with a compound of the formula (14a) in an equimolar amount which corresponds to the number of amino groups which have not been acylated by the compound of the formula (14b), to give a mixture of the compounds of the formulae (5a) and (7a)

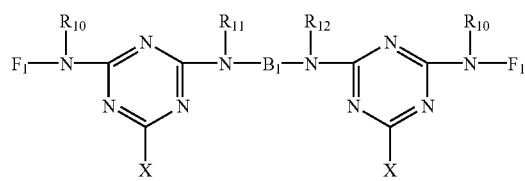

and

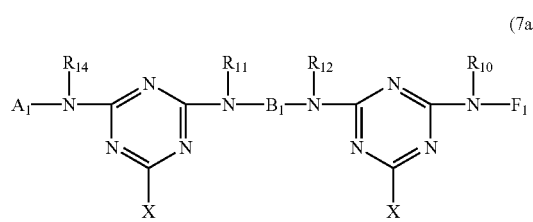

and (iv) if appropriate reacting the radicals X with a compound of the formula (13), in which $A_1$, $F_1$, $R_{10}$, $R_{11}$, $R_{12}$ and $R_{14}$ are as defined and preferred under the formulae (5) and (6), X is halogen, for example fluorine or chlorine, and $X_1$ is as defined and preferred under the formula (5), and is not halogen.

The ratio of the dyes of the formulae (5a) and (7a) in the mixture can vary in the range stated and depends here on the ratio of the compounds of the formulae (12) and (14b) according to process step (ii), the molar ratio of the compounds of the formulae (12) and (14b) being greater than 1 and, for example, 1.5 to 10, and preferably 2 to 6. Process step (ii) is advantageously carried out at a pH of 5 to 7.

The compounds of the formulae (10a), (10b), (12) and (13) are known or can be obtained analogously to known compounds.

The present invention furthermore relates to dyes of the formula (9)

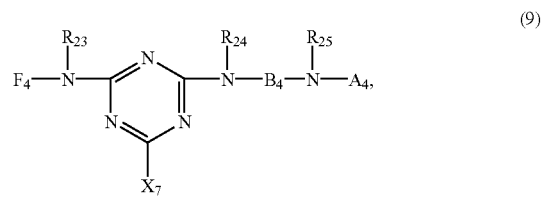

in which $R_{23}$ is as defined and preferred for $R_{10}$, $R_{13}$, $R_{14}$, $R_{17}$, $R_{18}$ and $R_{21}$, $R_{24}$ and $R_{25}$ independently of one another are as defined and preferred for $R_{11}$, $R_{12}$, $R_{15}$, $R_{16}$, $R_{19}$ and $R_{20}$, $B_4$ is as defined and preferred for $B_1$, $B_2$ and $B_3$, $A_4$ is a radical of the formula (VIII), $F_4$ is as defined and preferred for $F_1$, $F_2$ and $F_3$ and $X_7$ is as defined and preferred for $X_1$, $X_2$, $X_3$, $X_4$, $X_5$ and $X_6$.

Dyes of the formula (9) can be prepared by an addition reaction of a compound of the formula (16)

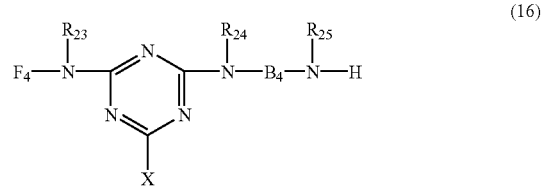

with a compound of the formula (17)

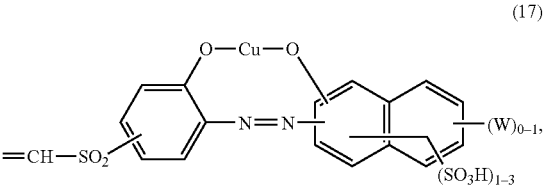

in which the radicals $R_{23}$, $R_{24}$, $R_{25}$, $B_4$, $F_4$ and W are as defined and preferred above and X is halogen, for example fluorine or chlorine, in the presence of a base, for example an alkali metal hydroxide, in particular sodium hydroxide, at a pH of, for example, 7 to 12, preferably 8 to 10.

If appropriate, the radical $X_7$ can be introduced by first reacting the compound of the formula (16) or the resulting addition product of the compounds of the formulae (16) and (17) with a compound of the formula H—$X_7$, in which $X_7$ is as defined and preferred, with the exception of halogen, by processes known per se.

The compounds of the formula (16) and (17) are known or can be prepared by processes known per se.

The present invention also relates to dyes (C) of the formula (18)

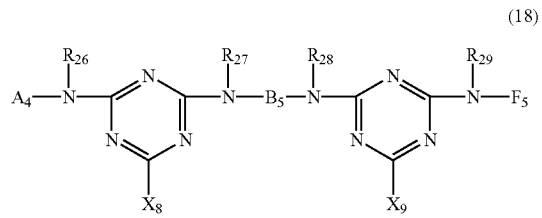

in which $R_{26}$, $R_{27}$, $R_{28}$ and $R_{29}$ independently of one another are hydrogen or substituted or unsubstituted $C_1$–$C_4$alkyl, $B_5$ is an aromatic bridge member and $F_5$ is a radical of the formula (I), (II), (III), (IVa), (IVb) or (IVc), in particular (I.1), (I.2), (I.3), (I.4), (I.5), (II.1), (II.2), (II.3), (III.1), (IVb) or (IVc), $A_4$ is a radical of the formula (4a), (4b), (4c), (4d), (4e), (4f), (4g), (4h), (4i), (4j), (4k), (4l), (4m), (4n), (4o), (4p), (4q), (4r), (V), (VI) or (VII), preferably (4a), (4d), (4e), (4o), (4p), (4q), (4r), (V), (VI) or (VII), and in particular (4e), (4o), (4p), (4q), (V), (VI) or (VII), and $X_8$ and $X_9$ are as defined and preferred above for $X_1$, $X_2$, $X_3$, $X_4$, $X_5$ and $X_6$.

$R_{26}$ and $R_{29}$ are as defined and preferred above for $R_{10}$, $R_{13}$, $R_{14}$, $R_{17}$, $R_{18}$ and $R_{21}$.

$R_{27}$ and $R_{28}$ are as defined and preferred above for $R_{11}$, $R_{12}$, $R_{15}$, $R_{16}$, $R_{19}$ and $R_{20}$.

$A_4$ is as defined and preferred above for radicals $A_1$, $A_2$ and $A_3$ of the formulae (4a), (4b), (4c), (4d), (4e), (4f), (4g), (4h), (4i), (4j), (4k), (4l), (4m), (4n), (4o), (4p), (4q), (4r), (V), (VI) and (VII).

$B_5$ is as defined and preferred above for aromatic bridge members $B_1$, $B_2$ and $B_3$.

$F_5$ is as defined and preferred above for radicals $F_1$, $F_2$ and $F_3$ of the formulae (I), (II), (III), (IVa), (IVb) and (IVc).

The present invention also relates to dyes (C) of the formula (18) in which $R_{26}$, $R_{27}$, $R_{28}$ and $R_{29}$ are as defined and preferred above, $B_5$ is an aliphatic bridge member, $F_5$ is as defined and preferred above, $A_4$ is a radical of the formula (4o)

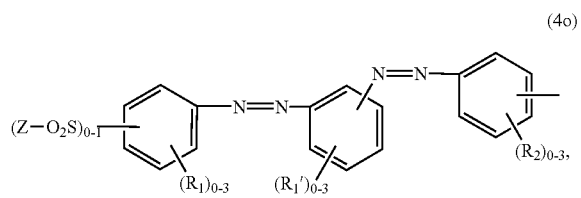

in which $(R_1)_{0-3}$ is 0 to 3 identical or different substituents from the group consisting of $C_1$–$C_4$alkyl, $C_1$–$C_4$alkoxy, $C_2$–$C_4$alkanoylamino, halogen, carboxyl and sulfo, in particular a sulfo group, $(R_1')_{0-3}$ is 0 to 3 identical or different substituents from the group consisting of $C_1$–$C_4$alkyl, $C_1$–$C_4$alkoxy, halogen, carboxyl and sulfo, in particular a sulfo group, $(R_2)_{0-3}$ is 0 to 3 identical or different substituents from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl or $C_1$–$C_4$alkoxy, amino, $C_2$–$C_4$alkanoylamino, ureido, hydroxyl, carboxyl, sulfomethyl, $C_1$–$C_4$alkylsulfonylamino and sulfo, in particular halogen, $C_1$–$C_4$alkyl, $C_1$–$C_4$alkoxy which is unsubstituted or substituted by hydroxyl or $C_1$–$C_4$alkoxy, amino, $C_2$–$C_4$alkanoylamino, ureido, $C_1$–$C_4$alkylsulfonylamino and sulfo, and Z is vinyl or a radical —$CH_2$—$CH_2$—U and U is a leaving group, and $X_8$ and $X_9$ are as defined and preferred above.

The radical $A_4$ preferably contains no fibre-reactive group of the formula —$SO_2$-Z.

$B_5$ is as defined and preferred above for aliphatic bridge members $B_1$, $B_2$ and $B_3$.

The dyes of the formula (18) according to the invention can be prepared by processes known per se, such as are described, for example, in U.S. Pat. No. 5,684,138.

The invention also relates to a process for dyeing or printing fibre materials containing hydroxyl groups or containing nitrogen with the dyes or dye mixtures according to the invention.

Fibre materials are, for example, the natural cellulosic fibres, such as cotton, linen, jute or hemp, and modified cellulosic fibres, such as cellulose or regenerated cellulose. The dyes and dye mixtures according to the invention are also suitable for dyeing or printing natural polyamide fibre materials, for example silk or wool, synthetic polyamide fibre materials, for example polyamide 6 or polyamide 6.6, or wool and synthetic polyamide blend fabrics. The dyes and dye mixtures according to the invention are particularly suitable for dyeing or printing natural polyamide fibre materials, and here in particular wool or chlorinated wool or wool with a washing machine-resistant finish.

The textile fibre materials mentioned can be in the most diverse forms of processing here, for example as fibre, yarn, fluff, woven fabric or knitted fabric.

The dyes and dye mixtures according to the invention are suitable for customary dyeing and printing processes and can be applied and fixed to the fibre material in the most diverse ways, in particular in the form of aqueous dye solutions or printing pastes. They are suitable both for the exhaust method and for pad dyeing, in which the goods are impregnated with aqueous dye solutions, which may contain salts, and the dyes are fixed after an alkali treatment or in the presence of alkali, with the action of heat if appropriate. The dyes and dye mixtures according to the invention are also suitable for the so-called cold pad-batch process, in which the dye is applied on the padder together with the alkali and is then fixed by storage at room temperature for several hours.

Dyeing of natural and synthetic polyamide fibre materials, in particular wool, is preferably carried out by the exhaust method at a pH of about 3 to 7, in particular 4 to 6, and at temperatures of, for example, 70 to 120° C., and in particular 90 to 105° C.

In addition to water and the dyes or dye mixtures according to the invention, the dye liquors or printing pastes can comprise further additives, for example shading dyes, salts, buffer substances, wetting agents, antifoams, levelling agents or agents which influence the properties of the textile material, for example softening agents, additives for a flame-retardant finish or soil-, water- and oil-repellent agents, as well as water-softening agents and natural or synthetic thickeners, for example alginates or cellulose ethers, these additives being known per se.

The dyes and dye mixtures according to the invention give level dyeings and prints with good allround properties, in particular good fastness to washing, rubbing, wet processing, wet rubbing and light. The dyes and dye mixtures according to the invention are furthermore distinguished by a uniform colour build-up, good affinity and high degrees of fixing. Furthermore, the otherwise customary after-treatment of the dyeings and prints with so-called fixing agents can be omitted in the case of the dyes and dye mixtures according to the invention.

The dye mixtures according to the invention in which the dye (A) has the formula (5), the dye (B) has the formula (6) and the dye (C) has the formula (7) and the dyes according to the invention has the formula (9) and (18) are furthermore distinguished by a good solubility.

In the following examples parts are parts by weight. The temperatures are degrees Celsius. Parts by weight and parts by volume bear the same relationship as the gram and cubic centimetre.

EXAMPLE 1 a) 9.22 parts of cyanuric chloride are suspended in 150 parts of ice-water. The pH is brought to 5 with 1 N sodium hydroxide solution and the temperature is kept at 0 to 2° C. A neutral solution of 29.80 parts of the copper complex of 5-amino-3-[3-phenyl-5-(2-carboxy-5-sulfophenyl)-1-formazano]-4-hydroxybenzenesulfonic acid in 250 parts of water is added to this suspension at 0 to 3° C. During the addition the pH is kept at 5 with a 2 N sodium hydroxide solution. After the addition, the mixture is stirred at 0 to 3° C. and pH 5 for about a further 2 hours. A solution of 5-[4,6-dichloro-1,3,5-triazin-2-ylamino]-3-[3-phenyl-5-(2-carboxy-5-sulfophenyl)-1-formazano]-4-hydroxybenzenesulfonic acid is obtained.

b) 3.56 parts of cyanuric chloride are suspended in 50 parts of ice-water. The pH is brought to 5.5 with 1 N sodium hydroxide solution and the temperature is kept at 0 to 2° C. A neutral solution of 10.02 parts of 4-(2-ureido-4-aminophenylazo)-azobenzene-3,4'-disulfonic acid in 120 parts of water is added to this suspension at 0 to 3° C. During the addition the pH is kept at 5.5 with 1 N sodium hydroxide solution. After the addition the mixture is stirred at 0 to 5° C. and pH 5.5 for about a further 3 hours. A suspension of 4-[2-ureido-4-(4,6-dichloro-1,3,5-triazin-2-ylamino)phenylazo]-azobenzene-3,4'-disulfonic acid is obtained.

c) The suspension obtained according to b) is added dropwise to a solution of 2.31 parts of 1,2-diaminopropane in 50 parts of ice-water, which has been brought to pH 5.5 to 6 with 16% hydrochloric acid, the pH being kept at 6 with 1 N sodium hydroxide solution. During the dropwise addition the temperature is allowed to rise to about 20° C. To bring the reaction to completion the temperature is increased to 50° C. in the course of several hours and the pH is increased to 6.5 to 7.

d) The solution obtained according to a) is allowed to run slowly into the solution obtained according to c), the pH being kept at 6.5 by addition of a 1N sodium hydroxide solution and the temperature being kept at 15 to 20° C. To bring the reaction to completion the temperature is increased to 50° C. and the pH is increased to 8.5 to 9. A few drops of 1,2-diaminopropane are added to the reaction mixture at a temperature of 35 to 40° C. in order to eliminate an excess of the compound according to process step a) in the reaction mixture. The pH is increased to 10 by addition of a 2 N sodium hydroxide solution. The reaction mixture is then allowed to cool to room temperature and the pH is brought to 8 with 2 N hydrochloric acid. The reaction mixture is clarified by filtration, and freed from the salt by dialysis and the resulting solution is freeze-dried. 54.6 parts of a dye mixture which comprises about 46% by weight of a dye which, in the form of the free acid, has the formula (101)

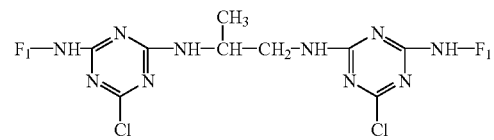

and 54% by weight of a dye which, in the form of the free acid, has the formula (102)

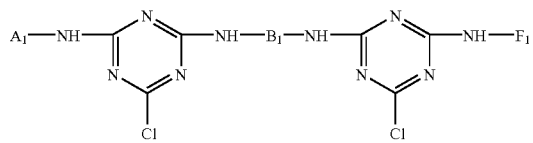

in which $F_1$ is a radical of the formula (103)

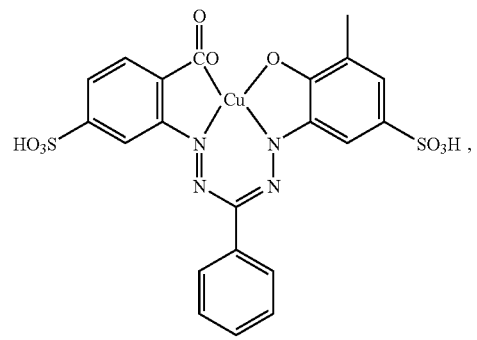

$A_1$ is a radical of the formula (104)

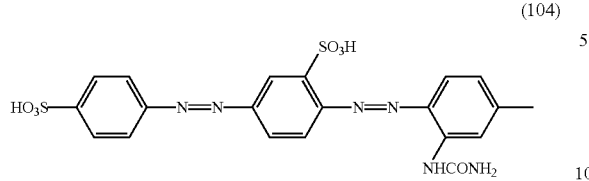

and $B_1$ is a radical of the formula

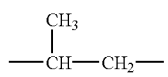

are obtained.

The dye mixture gives prints on paper and dyeings and prints on cotton and wool in black colour shades of high fastness to light.

EXAMPLE 2 a) 9.65 parts of cyanuric fluoride are added to a neutral solution of 35.80 parts of the copper complex of 5-amino-3-[3-phenyl-5-(2-carboxy-5-sulfophenyl)-1-formazano]-4-hydroxybenzenesuifonic acid in 350 parts of water at 0 to 2° C. in the course of 10 minutes. During the addition the pH is kept at 5.8 to 6 with a 15% sodium hydroxide solution. After the addition the mixture is stirred for about 15 minutes, the pH is brought to 3.5 to 3.8 with 32% hydrochloric acid and the mixture is stirred again for about 15 minutes. The pH is then brought to about 5.8 to 6 with a 15% sodium hydroxide solution. A solution of 5-[4,6-difluoro-1,3,5-triazin-2-ylamino]-3-[3-phenyl-5-(2-carboxy-5-sulfophenyl)-1-formazano]-4-hydroxybenzenesulfonic acid is obtained.

b) 3.38 parts of cyanuric fluoride are slowly added to a neutral solution of 10.02 parts of 4-(2-ureido-4-aminophenylazo)-azobenzene-3,4'-disulfonic acid in 120 parts of water at 0 to 2° C. During the addition the pH is kept at 7.3 to 7.5 with a 15% sodium hydroxide solution. After the addition the mixture is stirred at 0 to 2° C.for about 10 minutes and the pH is kept at 7.3 to 7.5. The pH is then brought to 3.5 with 32% hydrochloric acid and the mixture is stirred again at 0° C. for about 10 minutes. A solution of 4-[2-ureido-4-(4,6-difluoro-1,3,5-triazin-2-ylamino)phenylazo]-azobenzene-3,4'-disulfonic acid is obtained.

c) The cold solution (0° C.) obtained according to b) is slowly added dropwise to a solution of 2.31 parts of 1,2-diaminopropane in 50 parts of water at 20° C. and a pH of 6 to 6.5. The pH is kept at 6 to 6.5 here with 1 N sodium hydroxide solution and the temperature is kept at 20 to 25° C. To bring the reaction to completion the mixture is stirred under these conditions for a few hours.

d) The suspension obtained according to c) is cooled to 0 to 5° C. and the pH is brought to 8.5 with a 15% sodium hydroxide solution. The solution obtained according to a) is then metered in, the pH being kept at 8.5 with 15% sodium hydroxide solution. The temperature is slowly increased to 20 to 25° C. and the pH to 9. To bring the reaction to completion the mixture is stirred under these conditions for some hours. The resulting solution is then rendered neutral, clarified by filtration, freed from the salt by dialysis and freeze-dried. 42.8 parts of a dye mixture which comprises about 46% by weight of a dye which, in the form of the free acid, has the formula (105)

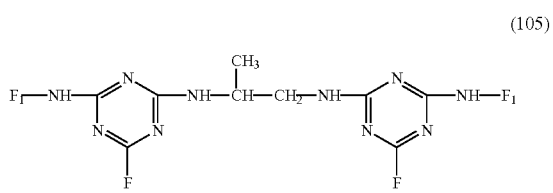

and 54% by weight of a dye which, in the form of the free acid, has the formula (106)

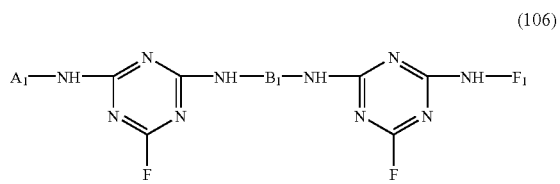

in which $F_1$ is a radical of the formula (103), $A_1$ is a radical of the formula (104) and $B_1$ is a radical of the formula

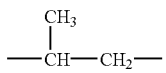

are obtained.

The dye mixture gives prints on paper and dyeings and prints on cotton and wool in black colour shades of high fastness to light.

EXAMPLE 3

10.7 parts of the dye mixture obtained according to Example 2d), comprising the dyes of the formulae (105) and (106), are dissolved in 200 parts of water, and 1.92 parts of morpholine are added at 20° C. and a pH of 8. The reaction mixture is heated to 50 to 55° C. and the pH is brought to 10 by addition of 15% sodium hydroxide solution. The mixture is stirred at this temperature for about a further 1 hour. The reaction mixture is then allowed to cool to room temperature and the pH is brought to 7 to 7.5 with 16% hydrochloric acid. The resulting solution is freed from the salt by dialysis and freeze-dried. 11.1 parts of a dye mixture which comprises about 46% by weight of a dye which, in the form of the free acid, has the formula (107)

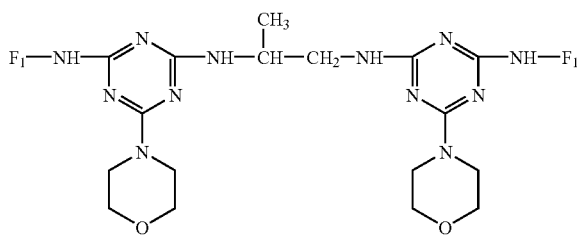

(107)

and 54% by weight of a dye which, in the form of the free acid, has the formula (108)

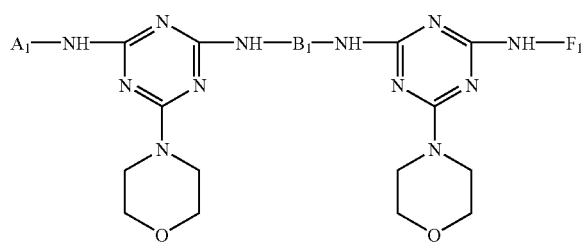

(108)

in which
F$_1$ is a radical of the formula (103), A$_1$ is a radical of the formula (104) and
B$_1$ is a radical of the formula

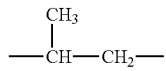

are obtained.

The dye mixture gives prints on paper and dyeings and prints on cotton and wool in black colour shades of high fastness to light.

EXAMPLES 4 to 30

The procedure described in Example 1 is repeated, using an equimolar amount of a disazo dye A$_1$-NH$_2$, in which A$_1$ is a radical of the formula (104a)

[structure showing R$_1$', R$_1$ substituted phenyl—N=N—phenyl(SO$_3$H)—N=N—phenyl with R$_2$', R$_2$ substituents]

and R$_1$, R$_1$', R$_2$ and R$_2$' are each as defined in Table 1,
in place of 10.02 parts of 4-(2-ureido-4-aminophenylazo)-azobenzene-3,4'-disulfonic acid. A mixture of dyes which, in the form of the free acid, have the formulae (101) and (102), in which
F$_1$ is a radical of the formula (103),
A$_1$ has the formula (104a), in which R$_1$, R$_1$', R$_2$ and R$_2$' are each as defined in Table 1,
and B$_1$ is a radical of the formula

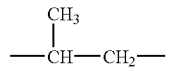

is obtained.

TABLE 1

| Example | R$_1$ | R$_1$' | R$_2$ | R$_2$' |
|---|---|---|---|---|
| 4 (31) | 4-SO$_3$H | H | —NH—CO—NH$_2$ | —OCH$_3$ |
| 5 (32) | 4-SO$_3$H | H | —NH—CO—NH$_2$ | —OCH$_2$CH$_2$—OH |
| 6 (33) | 4-SO$_3$H | H | —NH—CO—NH$_2$ | —Cl |
| 7 (34) | 4-SO$_3$H | H | —NH—CO—CH$_3$ | H |
| 8 (35) | 4-SO$_3$H | H | —NH—CO—CH$_3$ | —OCH$_3$ |
| 9 (36) | 4-SO$_3$H | H | —NH—CO—CH$_3$ | —OCH$_2$CH$_2$—OH |
| 10 (37) | 4-SO$_3$H | H | —NH—CO—CH$_3$ | —Cl |
| 11 (38) | 4-SO$_3$H | H | —CH$_3$ | H |
| 12 (39) | 4-SO$_3$H | H | —CH$_3$ | —OCH$_3$ |
| 13 (40) | 4-SO$_3$H | H | —CH$_3$ | —OCH$_2$CH$_2$—OH |
| 14 (41) | 4-SO$_3$H | H | —CH$_3$ | —Cl |
| 15 (42) | 4-SO$_3$H | H | —OCH$_3$ | —OCH$_3$ |
| 16 (43) | 4-SO$_3$H | H | —OCH$_2$CH$_2$—OH | —OCH$_2$CH$_2$—OH |
| 17 (44) | 4-SO$_3$H | H | —OCH$_2$CH$_2$—OCH$_3$ | —OCH$_2$CH$_2$—OCH$_3$ |
| 18 (45) Beispiel | 4-SO$_3$H | H | H | H |
| 19 (46) | 4-SO$_3$H | H | —NH—CO—CH$_2$CH$_3$ | H |
| 20 (47) | 4-SO$_3$H | H | —NH—CO—CH$_2$CH$_3$ | —OCH$_3$ |
| 21 (48) | 4-SO$_3$H | H | —NH—CO—CH$_2$CH$_3$ | —OCH$_2$CH$_2$—OH |
| 22 (49) | 4-SO$_3$H | H | —NH—CO—CH$_2$CH$_3$ | —Cl |
| 23 (50) | 4-SO$_3$H | H | —NH—SO$_2$—CH$_3$ | H |
| 24 (51) | 4-SO$_3$H | H | —NH$_2$ | —SO$_3$H |

TABLE 1-continued

| | $R_1$ | $R_1'$ | $R_2$ | $R_2'$ |
|---|---|---|---|---|
| 25 (52) | 4-SO$_3$H | H | —NH—CO—CH$_3$ | —SO$_3$H |
| 26 (53) | 4-COOH | H | —NH—CO—NH$_2$ | H |
| 27 (54) | 3-COOH | 5-COOH | —NH—CO—NH$_2$ | H |
| 28 (55) | 3-COOH | H | —NH—CO—NH$_2$ | H |
| 29 (56) | 2-COOH | 5-COOH | —NH—CO—NH$_2$ | H |
| 30 (57) | 2-COOH | H | —NH—CO—NH$_2$ | H |

The dye mixtures give prints on paper and dyeings and prints on cotton and wool in black colour shades of high fastness to light.

EXAMPLES 31 to 57

The procedure described in Example 2 is repeated, using an equimolar amount of a disazo dye $A_1$-NH$_2$, in which
$A_1$ is a radical of the formula (104a)
and $R_1$, $R_1'$, $R_2$ and $R_2'$ are each as defined in Table 1,
in place of 10.02 parts of 4-(2-ureido-4-aminophenylazo)-azobenzene-3,4'-disulfonic acid. A mixture of dyes which, in the form of the free acid, have the formulae (105) and (106), in which
$F_1$ is a radical of the formula (103),
$A_1$ has the formula (104a), in which $R_1$, $R_1'$, $R_2$ and $R_2'$ are each as defined in Table 1,
and $B_1$ is a radical of the formula

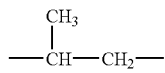

is obtained.

The dye mixtures give prints on paper and dyeings and prints on cotton and wool in black colour shades of high fastness to light.

EXAMPLES 58 to 63

The procedure described in Example 1 is repeated, using an equimolar amount of a formazan dye $F_1$—NH$_2$, in which $F_1$ is in each case as defined in Table 2, in place of 29.80 parts of the copper complex of 5-amino-3-[3-phenyl-5-(2-carboxy-5-sulfophenyl)-1-formazano]-4-hydroxybenzene-sulfonic acid. A mixture of dyes which, in the form of the free acid, have the formulae (101) and (102), in which
$F_1$ is in each case as defined in Table 2,
$A_1$ is a radical of the formula (104)
and $B_1$ is a radical of the formula

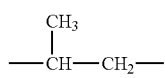

is obtained.

TABLE 2

| Example | $F_1$ |
|---|---|
| 58(64) | 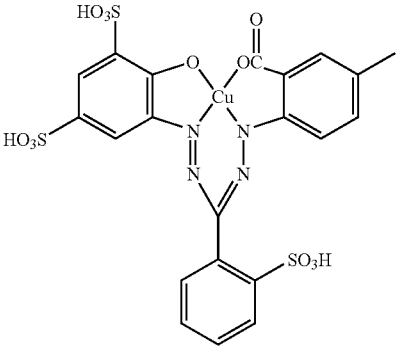 |
| 59(65) | 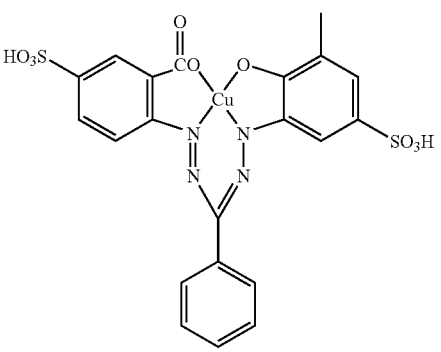 |
| 60(66) | 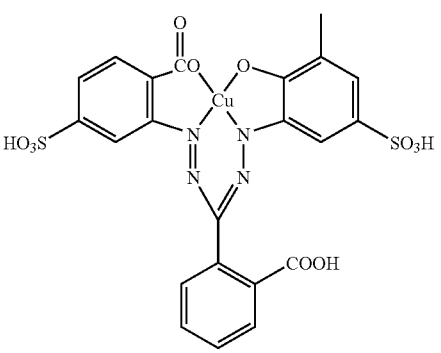 |

TABLE 2-continued

| Example | F₁ |
|---|---|
| 61(67) | (structure: Cu complex formazan with HOOC, COOH, SO₃H, and o-COOH phenyl) |
| 62(68) | (structure: Cu complex formazan with HOOC, SO₃H, and p-COOH phenyl) |
| 63(69) | (structure: Cu complex formazan with HO₃S, SO₃H, and o-SO₃H phenyl) |

The dye mixtures give prints on paper and dyeings and prints on cotton and wool in black colour shades of high fastness to light.

EXAMPLES 64 to 69

The procedure described in Example 2 is repeated, except that the equimolar amount of a formazan dye $F_1$—$NH_2$, in which $F_1$ is in each case as defined in Table 2, is used in place of 35.80 parts of the copper complex of 5-amino-3-[3-phenyl-5-(2-carboxy-5-sulfophenyl)-1-formazano]-4-hydroxybenzenesulfonic acid. A mixture of dyes which, in the form of the free acid, have the formulae (105) and (106), in which $F_1$ is in each case as defined in Table 2, $A_1$ is a radical of the formula (104)

and $B_1$ is a radical of the formula

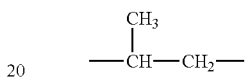

is obtained.

The dye mixtures give prints on paper and dyeings and prints on cotton and wool in black colour shades of high fastness to light.

EXAMPLES 70 to 77

The procedure described in Example 1 is repeated, except that an equimolar amount of an azo dye $A_1$-$NH_2$, in which $A_1$ is in each case as defined in Table 3, is used in place of the 10.02 parts of 4-(2-ureido-4-aminophenylazo)-azobenzene-3,4'-disulfonic acid. A mixture of dyes which, in the form of the free acid, have the formulae (101) and (102), in which $F_1$ is a radical of the formula (103), $A_1$ is in each case as defined in Table 3, and $B_1$ is a radical of the formula

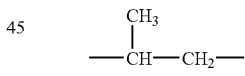

is obtained.

The dye mixtures give prints on paper and dyeings and prints on cotton and wool in black colour shades of high fastness to light.

TABLE 3

| Example | A₁ |
|---|---|
| 70 | (structure: naphthalene with SO₃H, HO₃S, SO₃H substituents linked via —N=N— to phenyl —N=N— phenyl) |

TABLE 3-continued
| Example | $A_1$ |
|---|---|
| 71 | 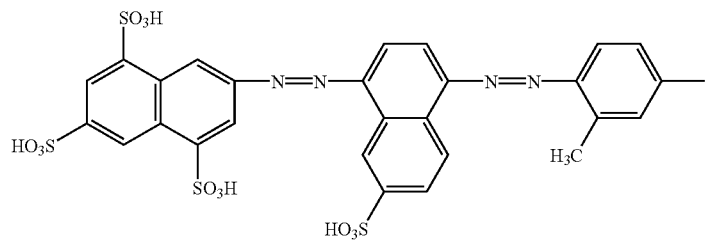 |
| 72 | 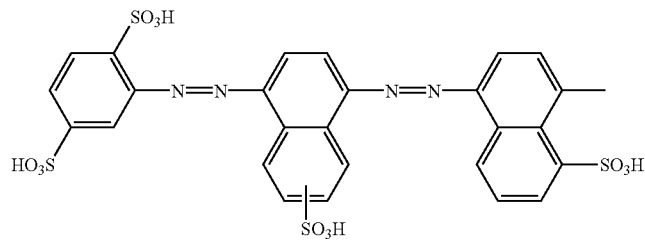 |
| 73 | 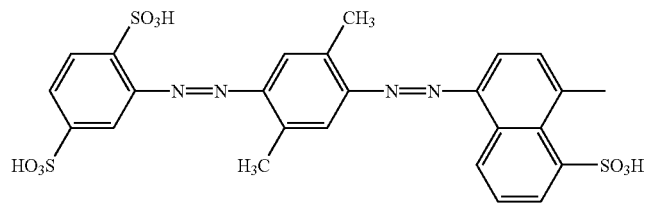 |
| 74 | 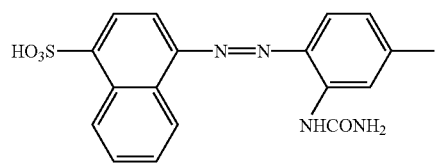 |
| 75 | 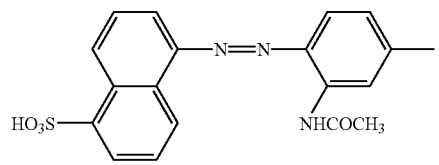 |
| 76 | 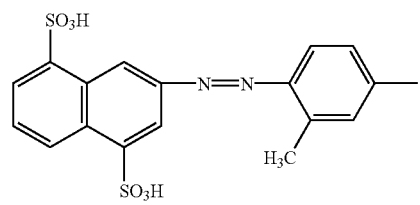 |
| 77 | 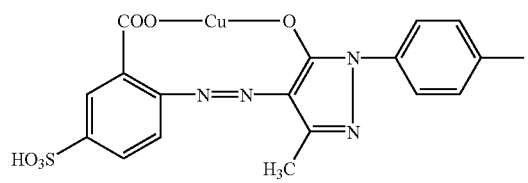 |

EXAMPLES 78 bis 85

The procedure described in Example 1 is repeated, except that an equimolar amount of a copper complex azo dye $F_1$—$NH_2$, in which $F_1$ is in each case as defined in Table 4, is used in place of the 29.80 parts of the copper complex of 5-amino-3-[3-phenyl-5-(2-carboxy-5-sulfophenyl)-1-formazano]-4-hydroxybenzenesulfonic acid. A mixture of dyes which, in the form of the free acid, have the formulae (101) and (102), in which
$F_1$ is in each case as defined in Table 4,
$A_1$ is a radical of the formula (104)
and $B_1$ is a radical of the formula

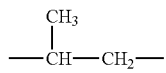

is obtained.

TABLE 4

| Example | F1 (Chromophor of the formula) |
|---|---|
| 78 | (I.1) |
| 79 | (I.2) |
| 80 | (I.3) |
| 81 | (I.4) |
| 82 | (I.5) |
| 83 | (II.1) |
| 84 | (II.2) |
| 84a | (II.3) |
| 85 | (III.1) |

EXAMPLES 86 to 110

The procedure described in Example 1 is repeated, except that an equimolar amount of a diamine,

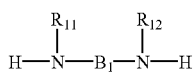

in which the radical

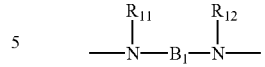

is in each case as defined in Table 5, is used in place of the 2.83 parts of 1,2-diaminopropane. A mixture of dyes which, in the form of the free acid, have the formulae (109) and (110)

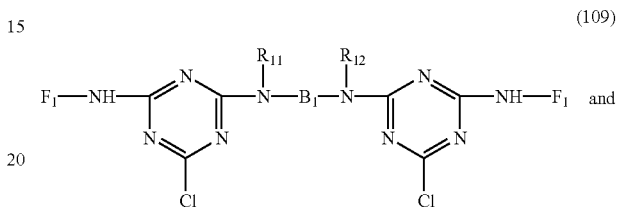

(109)

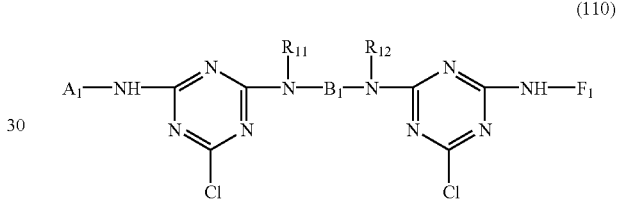

(110)

in which
$F_1$ is a radical of the formula (103),
$A_1$ is a radical of the formula (104) and the radical

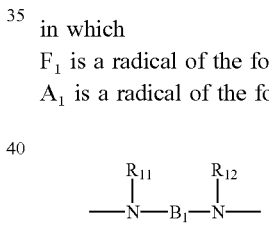

is in each case as defined in Table 5 is obtained.

TABLE 5

| Example | $\begin{array}{cc} R_{11} & R_{12} \\ | & | \\ -N-B_1-N- \end{array}$ |
|---|---|
| 86 | —NH—CH$_2$—CH$_2$—NH— |
| 87 | —NH—CH$_2$—CH$_2$—CH$_2$—NH— |
| 88 | —NH—CH$_2$—CH$_2$—N(CH$_3$)— |
| 89 | —N(CH$_3$)—CH$_2$—CH$_2$—N(CH$_3$)— |
| 90 | —NH—(CH$_2$)$_2$—NH—(CH$_2$)$_2$—NH— |
| 91 | —NH—(CH$_2$)$_3$—O—(CH$_2$)$_4$—O—(CH$_2$)$_3$—NH— |
| 92 | —NH—(CH$_2$)$_2$—O—(CH$_2$)$_2$—O—(CH$_2$)$_2$—NH— |
| 93 | —NH—CH$_2$—CH$_2$—N(CH$_2$CH$_3$)— |
| 94 | —NH—CH$_2$—CH$_2$—N(CH$_2$CH$_2$—COOH)— |
| 95 | —NH—CH$_2$—CH$_2$—N(CH$_2$—COOH)— |

TABLE 5-continued

| Example | —N(R₁₁)—B₁—N(R₁₂)— |
|---|---|
| 96 | —NH—CH₂—C(CH₃)(CH₃)—CH₂—NH— |
| 97 | —NH—CH(C₂H₅)—CH₂—CH₂—NH— |
| 98 | —NH—CH₂—CH(CH₃)—CH₂—CH₂—CH₂—NH— |
| 99 | —NH—CH₂—CH(OH)—CH₂—NH— |
| 100 | —NH—CH₂—CH(OSO₃H)—CH₂—NH— |
| 101 | —NH—C₆H₄—CH₂—NH— |
| 102 | —NH—CH₂—C₆H₄—CH₂—NH— |
| 103 | —NH—(3,3,5-trimethylcyclohexyl with CH₂—NH—) |
| 104 | —NH—C₆H₄—NH— |
| 105 | —NH—C₆H₃(SO₃H)—NH— |
| 106 | —NH—C₆H₄—CO—NH—C₆H₃(SO₃H)—NH— |
| 107 | —NH—C₆H₄—SO₂—NH—C₆H₄—NH— |
| 108 | —NH—C₆H₄—SO₂—C₆H₄—NH— |

TABLE 5-continued

| Example | —N(R11)—B1—N(R12)— |
|---|---|
| 109 | —NH—C6H3(SO3H)—NH—C6H4—NH— |
| 110 | —NH—C6H3(SO3H)—CH=CH—C6H3(SO3H)—NH— |

The dye mixtures give prints on paper and dyeings and prints on cotton and wool in black colour shades of high fastness to light.

EXAMPLES 111 to 141

The procedure described in Example 3 is repeated, except that an equimolar amount of a compound of the formula H—X, in which the radical X is in each case as defined in Table 6, is used in place of the 1.92 parts of morpholine. A mixture of dyes which, in the form of the free add, have the formulae (111) and (112)

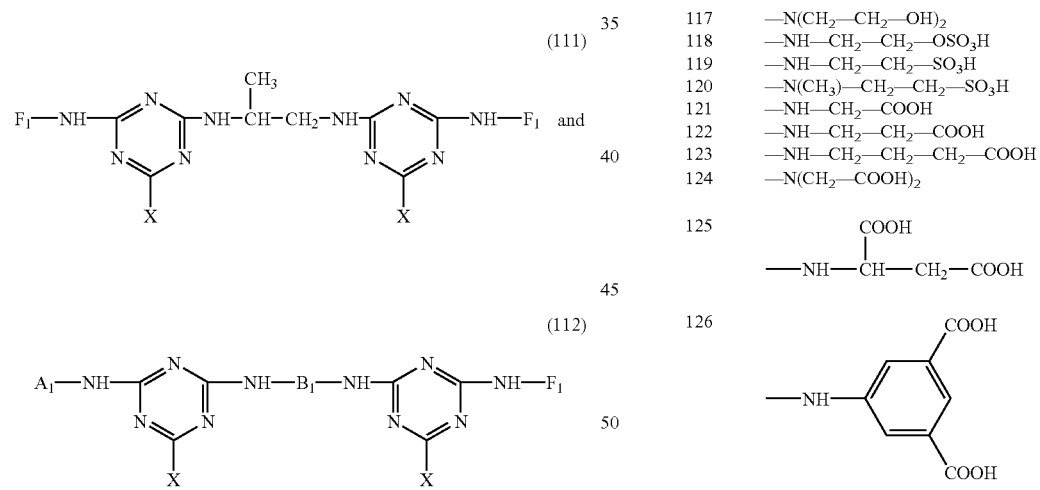

in which
$F_1$ is a radical of the formula (103),
$A_1$ is a radical of the formula (104) and
$B_1$ is a radical of the formula

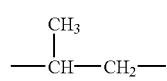

and
the radical X is in each case as defined in Table 6, is obtained.

TABLE 6

| Example | X |
|---|---|
| 111 | —NH$_2$ |
| 112 | —N(CH$_3$)$_2$ |
| 113 | —NH—CH$_2$—CH$_3$ |
| 114 | —NH—CH$_2$—CH$_2$—OH |
| 115 | —NH—CH$_2$—CH$_2$—O—CH$_2$—CH$_2$—OH |
| 116 | —N(CH$_2$—CH$_2$—OH)(CH$_2$—CH$_3$) |
| 117 | —N(CH$_2$—CH$_2$—OH)$_2$ |
| 118 | —NH—CH$_2$—CH$_2$—OSO$_3$H |
| 119 | —NH—CH$_2$—CH$_2$—SO$_3$H |
| 120 | —N(CH$_3$)—CH$_2$—CH$_2$—SO$_3$H |
| 121 | —NH—CH$_2$—COOH |
| 122 | —NH—CH$_2$—CH$_2$—COOH |
| 123 | —NH—CH$_2$—CH$_2$—CH$_2$—COOH |
| 124 | —N(CH$_2$—COOH)$_2$ |
| 125 | —NH—CH(COOH)—CH$_2$—COOH |
| 126 | —NH—C$_6$H$_3$(COOH)$_2$ (3,5) |
| 127 | —NH—C$_6$H$_4$—COOH (2) |
| 128 | —NH—C$_6$H$_3$(COOH)$_2$ (2,4) |

| 129 | —NH—C₆H₄(HO₃S)- (ortho SO₃H) |
| 130 | —NH—C₆H₄—SO₃H |
| 131 | —NH—C₆H₃(HO₃S)(SO₃H) |
| 132 | —NH—C₆H₄—CH₂—COOH |
| 133 | —NH—C₆H₄—CONH—CH₂—COOH |
| 134 | —NH—CH₂—C₆H₄—COOH |
| 135 | —NH— naphthalene (SO₃H, HO₃S, SO₃H) |
| 136 | —NH— naphthalene (SO₃H, SO₃H, SO₃H) |
| 137 | —NH— naphthalene (SO₃H, HO₃S, SO₃H) |
| 138 | —S—CH₂—CH₂—COOH |
| 139 | —S—CH₂—COOH |
| 140 | —S—CH₂—CH₂—OH |
| 141 | —S—CH₂—CH₂—CH₂—SO₃H |

The dye mixtures give prints on paper and dyeings and prints on cotton and wool in black shades of high fastness to light.

EXAMPLE 142 a) 14 parts of cyanuric fluoride are added dropwise to a neutral solution of 52 parts of 4-(2-ureido-4-aminophenylazo)-azobenzene-3,4'-disulfonic acid and 5 parts of disodium hydrogen phosphate in 500 parts of water at a temperature below 2° C., the pH being kept constant by addition of sodium hydroxide solution. When the reaction has ended 7.4 parts of 1,2-diaminopropane in 54 parts of water are added dropwise such that the temperature does not exceed 5° C. and the pH remains at a value of 6. The pH is then kept at a value of 6. A solution of 4-{2-ureido-4-[4-(2-aminopropylamino)-6-fluoro-1,3,5-triazin-2-ylamino]phenylazo}-azobenzene-3,4'-disulfonic acid is obtained.

b) 14 parts of cyanuric fluoride are added dropwise to a neutral solution of 60 parts of the copper complex of 5-amino-3-[3-phenyl-5-(2-carboxy-5-sulfophenyl)-1-formazano]-4-hydroxy-benzenesulfonic acid and 5 parts of disodium hydrogen phosphate in 500 parts of water at a temperature below 2° C., the pH being kept constant by addition of sodium hydroxide solution. A solution of 5-[4,6-difluoro-1,3,5-triazin-2-ylamino]-3-[3-phenyl-5-(2-carboxy-5-sulfophenyl)-1-formazano]-4-hydroxybenzenesulfonic add is obtained.

c) The solution according to b) is added to the solution according to a), the pH being increased to and kept at a value of 8.5. The mixture is allowed to warm to room temperature, the solution is freed from the salt by dialysis and the dye is concentrated by evaporation. A dye which, in the form of the free acid, is the compound of the formula (113)

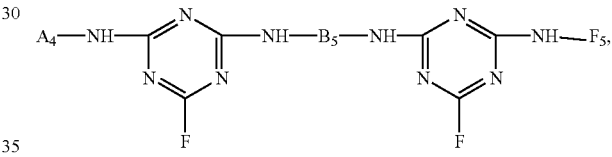

(113)

in which $F_5$ is a radical of the formula (103), $A_4$ is a radical of the formula (104) and $B_5$ is a radical of the formula

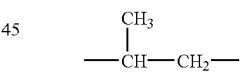

is obtained.

The dye dyes cotton and wool in olive colour shades of high fastness to light.

EXAMPLE 143

19 parts of morpholine are added at 20° C. and a pH of 8.5 to a solution obtained according to Example 142c), which comprises the dye of the formula (113). The reaction mixture is heated to 50 to 55° C. and the pH is brought to 10 by addition of sodium hydroxide solution. The mixture is stirred at this temperature for about a further one hour. The reaction mixture is then allowed to cool to room temperature, and the pH is brought to 7 to 7.5 with aqueous hydrochloric acid. The resulting solution is freed from the salt by dialysis and evaporated. A dye which, in the form of the free acid, has the formula (114)

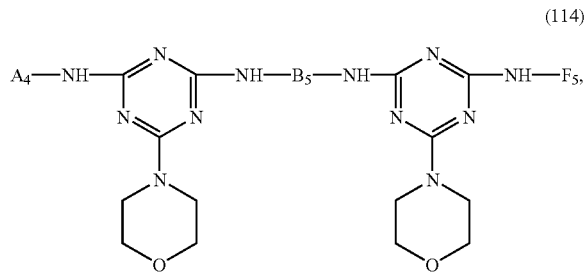
(114)

in which $F_5$ is a radical of the formula (103), $A_4$ is a radical of the formula (104) and $B_5$ is a radical of the formula

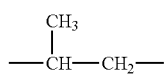

is obtained.

The dye dyes cotton and wool in olive colour shades of high fastness to light.

The procedure described in Example 142 is repeated, except that an equimolar amount of a disazo dye $A_1$-$NH_2$, in which $A_1$ is a radical of the formula

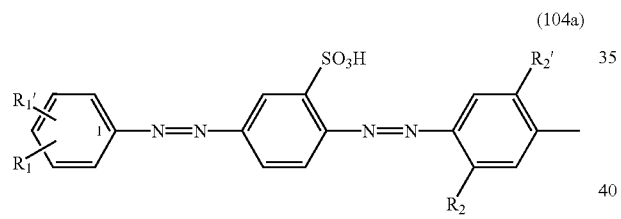
(104a)

and $R_1$, $R_1'$, $R_2$ and $R_2'$ are each as defined in Table 1, is used in place of the 52 parts of 4-(2-ureido-4-aminophenylazo)-azobenzene-3,4'-disulfonic acid. Valuable dyes which dye cotton and wool in olive colour shades of high fastness to light are likewise obtained.

The procedure described in Example 142 is repeated, except that an equimolar amount of a formazan dye shown in Table 2 or of a copper complex azo dye shown in Table 4 is used in place of the 60 parts of the copper complex of 5-amino-3-[3-phenyl-5-(2-carboxy-5-sulfophenyl)-1-formazano]-4-hydroxybenzenesulfonic acid. Valuable dyes which dye cotton and wool in olive colour shades of high fastness to light are likewise obtained.

The procedure described in Example 142 is repeated, except that an equimolar amount of a diamine according to Table 5 is used in place of the 7.4 parts of 1,2-diaminopropane. Valuable dyes which dye cotton and wool in olive colour shades of high fastness to light are likewise obtained.

The procedure described in Example 143 is repeated, except that an equimolar amount of a compound X—H, in which X is in each case as defined in Table 6, is used in place of the 19 parts of morpholine. Valuable dyes which dye cotton and wool in olive colour shades of high fastness to light are likewise obtained.

EXAMPLE 144 a) 9.22 parts of cyanuric chloride are suspended in 150 parts of ice-water. The pH is brought to 5 with 1 N sodium hydroxide solution and the temperature is kept at 0 to 2° C. A neutral solution of 29.80 parts of the copper complex of 5-amino-3-[3-phenyl-5-(2-carboxy-5-sulfophenyl)-1-formazano]-4-hydroxybenzenesulfonic acid in 250 parts of water is added to this suspension at 0 to 3° C. During the addition the pH is kept at 5 with a 2 N sodium hydroxide solution. After the addition the mixture is stirred at 0 to 3° C. and pH 5 for about a further 2 hours. A solution of 5-[4,6-dichloro-1,3,5-triazin-2-ylamino]-3-(3-phenyl-5-(2-carboxy-5-sulfophenyl)-1-formazano]4-hydroxybenzenesulfonic acid is obtained.

b) The solution obtained according to a) is added dropwise to a solution, brought to pH 6 to 6.5 with 32% hydrochloric acid, of 37.1 parts of 1,2-diaminopropane in 50 parts of ice-water, the pH being kept at 6.5 by addition of a 15% sodium hydroxide solution. During the dropwise addition the temperature is allowed to rise to about 20° C. To bring the reaction to completion the mixture is stirred at 30° C. for 2 days. The crystalline product is then filtered off, washed with water and taken up in 700 parts of water. Complete solution occurs by increasing the pH to 9.5 with 15% sodium hydroxide solution. The dye is precipitated again by addition of 90 parts of sodium chloride, filtered off and washed with 15% sodium chloride solution. After drying at 50° C. in vacuo 54.8 parts of a compound which, in the form of the free acid, has the formula

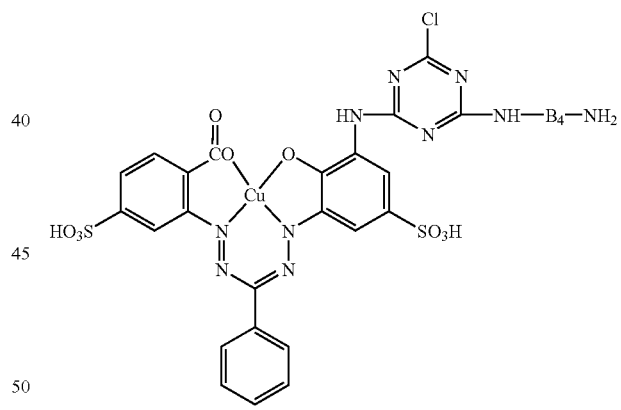

in which $B_4$ is a radical of the formula

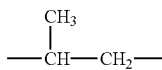

is obtained.

c) 10.96 parts of the compound according to b) are dissolved in 75 parts of water under neutral conditions and the pH is then brought to 8.8 with 1 N sodium hydroxide solution. A neutral solution of 4.58 parts of a compound of the formula

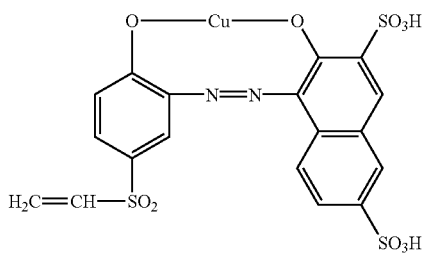

(obtained by vinylation of C.I. Reactive Red 23 in an alkaline medium) in 50 parts of water is added dropwise to this solution at 50 to 55° C., the pH being kept at 8.8 by addition of a 1N sodium hydroxide solution. To bring the reaction to completion the mixture is further stirred for some hours. The solution is clarified by filtration, freed from the salt by dialysis and freeze-dried. 11.3 parts of a compound which, in the form of the free acid, has the formula (115)

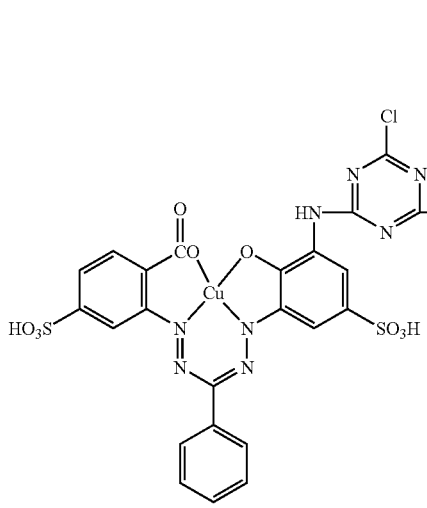

in which $B_4$ is a radical of the formula

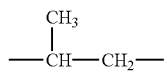

are obtained.

APPLICATION EXAMPLE 1

10.0 parts of the dye mixture according to Example 1 are dissolved in 90.0 parts of distilled water and 10 parts of 1,2-propylene glycol and the solution is filtered. The ink thus obtained is printed onto a commercially available ink-jet paper or photographic paper or a glossy film (for example Epson Glossy Film) by means of a drop-on-demand inkjet printer. The resulting print in a black shade has a very good fastness to light.

The procedure described in application example 1 is repeated, except that one of the dye mixtures according to Examples 2 to 141 is used in place of the dye mixture according to Example 1. Black prints of very good fastness to light are likewise obtained.

APPLICATION EXAMPLE 2

3.57 parts of a dye which, in the form of the free acid, has the formula (105)

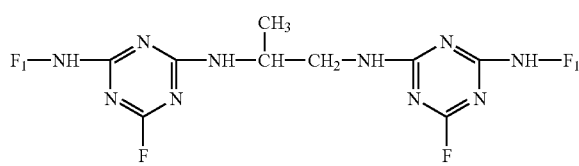

in which $F_1$ is a radical of the formula (103)

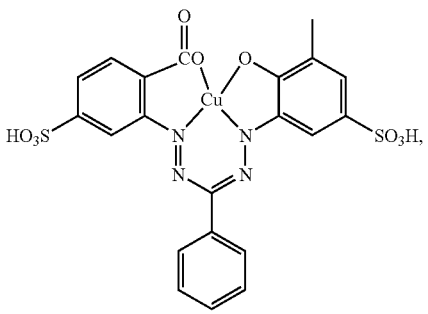

and 1.20 parts of a dye which, in the form of the free acid, has the formula (116)

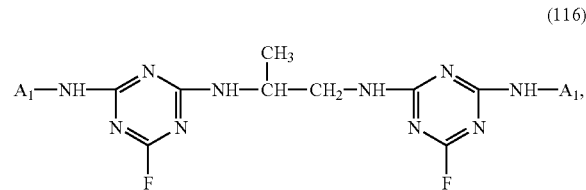

(116)

in which $A_1$ is a radical of the formula (104)

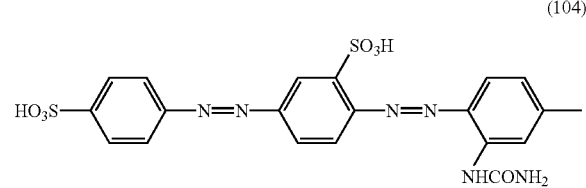

(104)

are dissolved in 40 parts of distilled water and 5.0 parts of 1,2-propylene glycol and the solution is filtered. The ink thus obtained is printed onto a commercially available ink-jet paper, photographic paper or a glossy film (for example Epson Glossy Film) or onto cotton according to application example 5 by means of a drop-on-demand ink-jet printer. The resulting print in a black shade has a very good fastness to light.

APPLICATION EXAMPLE 3

3.78 parts of a dye of the formula (IV.8) and 1.20 parts of a dye of the formula (116), in which $A_1$ is a radical of the formula (104), are dissolved in a mixture of 35 parts of distilled water, 5 parts of 1,2-propylene glycol and 5.0 parts of glycerol and the solution is filtered. The ink thus obtained is printed onto a commercially available ink-jet paper or photographic paper or a glossy film (for example Epson Glossy Film) by means of a drop-on-demand ink-jet printer. The resulting print in a black shade has a very good fastness to light.

APPLICATION EXAMPLE 4

The following inks (a) to (m) are prepared by dissolving the compounds stated in distilled water and the stated solvents. The inks are filtered and printed onto a commercially available ink-jet paper or photographic paper or a glossy film (for example Epson Glossy Film) by means of a drop-on-demand ink-jet printer. The prints in a black shade obtained with the inks (a) to (m) have a very good fastness to light.

(a) 8.1 parts of a dye of the formula (IV.7); 1.8 parts of a dye of the formula (2.4); 10.0 parts of 1,2-propylene glycol; 10.0 parts of glycerol and 70.1 parts of water.

(b) 9.2 parts of a dye of the formula (IV.2); 2.1 parts of a dye of the formula (2.7); 20.0 parts of 1,2-propylene glycol and 68.7 parts of water.

(c) 7.5 parts of a dye of the formula (IV.3); 2.3 parts of a dye of the formula (2.1); 20.0 parts of glycerol and 70.2 parts of water.

(d) 8.2 parts of a dye of the formula (IV.4); 1.9 parts of a dye of the formula (2.2); 0.2 parts of C.I. Reactive Red 23; 10.0 parts of 1,2-propylene glycol; 5.0 parts of ε-caprolactam and 74.7 parts of water.

(e) 7.7 parts of a dye of the formula (IV.5); 2.5 parts of a dye of the formula (2.3); 0.1 part of C.I. Reactive Red 130; 10.0 parts of 1,2-propylene glycol; 10.0 parts of glycerol; 5.0 parts of N-methylpyrrolidone and 64.7 parts of water.

(f) 8.6 parts of a dye of the formula (IV.6); 2.7 parts of a dye of the formula (2.6); 20.0 parts of 1,2-propylene glycol and 68.7 parts of water.

(g) 9.0 parts of a dye of the formula (IV.9); 1.7 parts of a dye of the formula (2.5); 0.1 part of C.I. Reactive Red 23; 10.0 parts of 1,2-propylene glycol; 10.0 parts of glycerol and 69.2 parts of water.

(h) 10.0 parts of the dye mixture according to Example 1; 0.1 part of C.I. Reactive Red 23; 10.0 parts of 1,2-propylene glycol; 5.0 parts of glycerol; 5.0 parts of ε-caprolactam and 69.9 parts of water.

(i) 9.2 parts of a dye of the formula (IV.3); 1.8 parts of a dye of the formula (2.6); 20.0 parts of 1,2-propylene glycol and 69.0 parts of water.

(j) 9.0 parts of the dye mixture according to Example 1; 1.0 part of the dye according to Example 144; 20.0 parts of 1,2-propylene glycol; 5.0 parts of ε-caprolactam and 65.0 parts of water.

(k) 8.0 parts of a dye of the formula

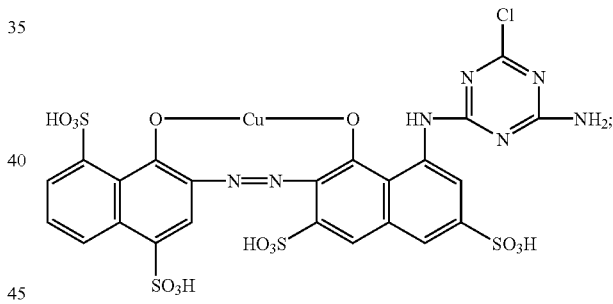

(I.1a)

2.0 parts of a dye of the formula (2.6); 20.0 parts of 1,2-propylene glycol and 70.0 parts of water.

(l) 12.3 parts of a dye of the formula

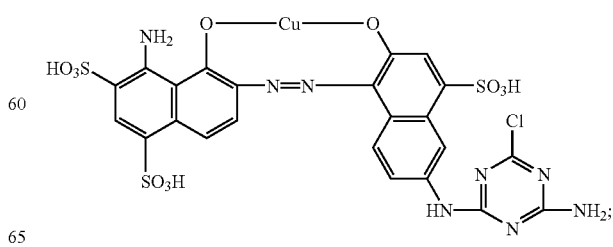

(I.2a)

2.3 parts of a dye of the formula (2.3); 20.0 parts of 1,2-propylene glycol and 65.4 parts of water.

(m) 11.0 parts of a dye of the formula

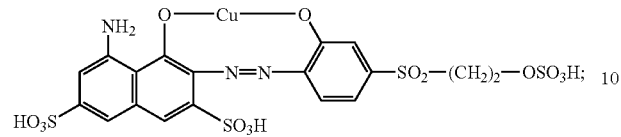
(II.3a)

1.9 parts of a dye of the formula (2.2); 20.0 parts of 1,2-propylene glycol and 67.1 parts of water.

APPLICATION EXAMPLE 5 a) Mercerized cotton-satin is added with a liquor comprising 30 g/l of sodium carbonate (liquor pick-up 70%) and dried.

b) An aqueous ink with a viscosity of 2 mPa.s, comprising 15% by weight of the dye mixture according to Example 1, 15% by weight of 1,2-propylene glycol, 0.5% by weight of borax and 69.5% by weight of water, is printed with a drop-on-demand ink-jet head (bubble jet) onto the cotton-satin pretreated according to step a). The print is dried completely, fixed in saturated steam for 4 minutes at 102° C., rinsed in the cold, washed out at the boil, rinsed again and dried. A black print with very good fastness to light is obtained.

The procedure described in application example 5 is repeated, except that one of the dye mixtures according to Examples 2 to 141 is used in place of the dye mixture according to Example 1. Black prints of very good fastness to light are likewise obtained.

Dyeing Instructions 2 parts of the dye obtained according to Example 142 are dissolved in 400 parts of water; 1500 parts of a solution which comprises 53 g of sodium chloride per litre are added to this. 100 parts of cotton fabric are introduced into this dyebath at 40° C. After 45 minutes 100 parts of a solution which comprises 16 g of sodium hydroxide and 20 g of calcined sodium carbonate per litre are added. The temperature of the dyebath is kept at 40° C. for a further 45 minutes. Thereafter, the dyed goods are rinsed, soaked at the boil with a nonionic detergent for a quarter of an hour, rinsed again and dried.

Printing Instructions 3 parts of the dye obtained according to Example 142 are sprinkled, with rapid stirring, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the resulting printed material is steamed in saturated steam for 2 minutes at 102° C. The printed fabric is then rinsed, soaked at the boil, if appropriate, and rinsed again, and then dried.

What is claimed is:

1. A dye of the formula (18)

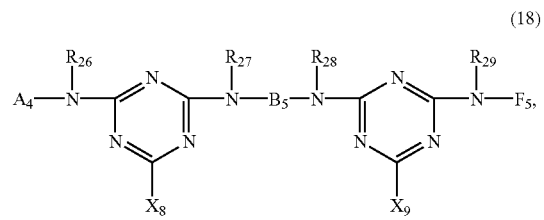
(18)

in which $R_{26}$, $R_{27}$, $R_{28}$ and $R_{29}$ independently of one another are hydrogen or substituted or unsubstituted $C_1$–$C_4$alkyl, $B_5$ is an aliphatic bridge member, $A_4$ is a radical of the formula (4o)

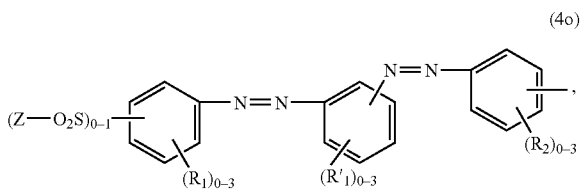
(4o)

in which $(R_1)_{0-3}$ is 0 to 3 identical or different substituents selected from the group consisting of $C_1$–$C_4$alkyl, $C_1$–$C_4$alkoxy, $C_2$–$C_4$alkanoylamino, halogen, carboxyl and sulfo, $(R_1')_{0-3}$ is 0 to 3 identical or different substituents selected from the group consisting of $C_1$–$C_4$alkyl, $C_1$–$C_4$alkoxy, halogen, carboxyl and sulfo, $(R_2)_{0-3}$ is 0 to 3 identical or different substituents selected from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl or $C_1$–$C_4$alkoxy, amino, $C_2$–$C_4$alkanoylamino, ureido, hydroxyl, carboxyl, sulfomethyl, $C_1$–$C_4$alkylsulfonylamino and sulfo and Z is vinyl or a radical —$CH_2$—$CH_2$—U and U is a leaving group, $F_5$ is a radical of the formula (I), (II), (III), (IVa), (IVb) or (IVc)

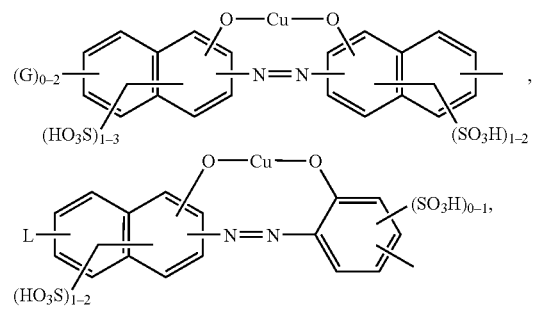

-continued

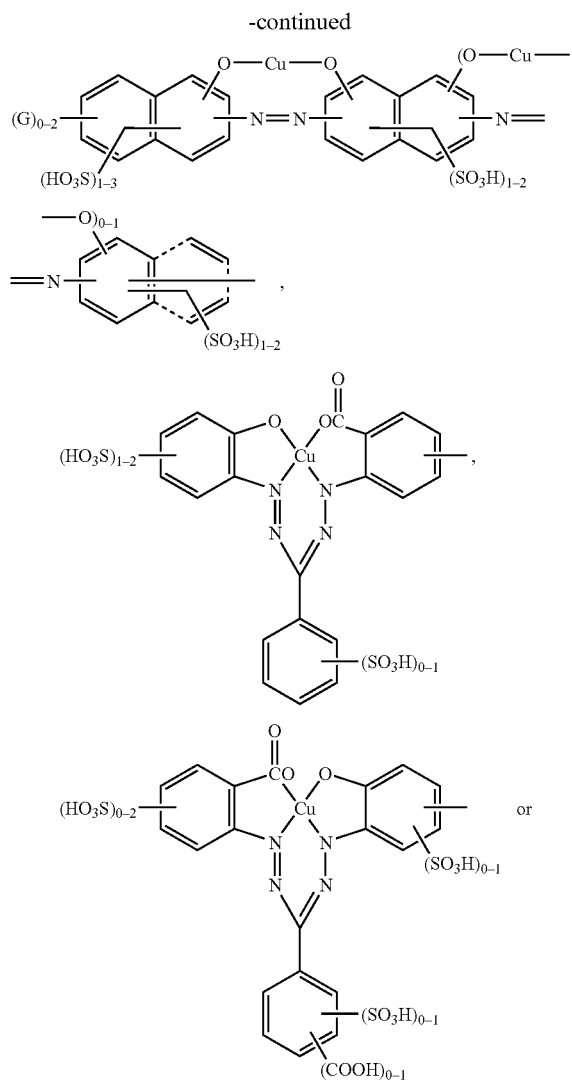

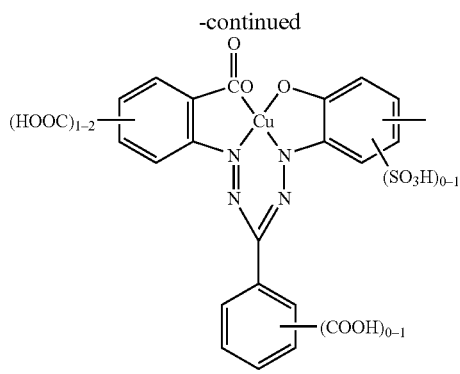

in which (G)$_{0-2}$ is 0 to 2 identical or different substituents selected from the group consisting of substituted or unsubstituted amino, hydroxyl and nitro, L is substituted or unsubstituted amino, and $X_8$ and $X_9$ independently of one another are halogen, hydroxyl, $C_1$–$C_4$alkoxy which is unsubstituted or substituted in the alkyl moiety, phenoxy which is unsubstituted or substituted in the phenyl ring, $C_1$–$C_4$alkylthio which is unsubstituted or substituted in the alkyl moiety, phenylthio which is unsubstituted or substituted in the phenyl ring, amino, N-mono- or N,N-di-$C_1$–$C_6$alkylamino which are unsubstituted or substituted in the alkyl moiety, $C_5$–$C_7$-cycloalkylamino which is unsubstituted or substituted in the cycloalkyl ring, phenyl- or naphthylamino or N—$C_1$–$C_4$alkyl-N-phenyl- or N—$C_1$–$C_4$alkyl-N-naphthylamino which are unsubstituted or substituted in the aryl moiety, benzylamino which is unsubstituted or substituted in the phenyl moiety, morpholino or piperidin-1-yl.

2. A process for dyeing or printing fibre materials containing hydroxyl groups or containing nitrogen, which comprises dyeing or printing said fibre materials with a dye of the formula (18) according to claim 1.

\* \* \* \* \*